United States Patent
Vu

(10) Patent No.: US 9,503,170 B2
(45) Date of Patent: Nov. 22, 2016

(54) SYSTEM, METHOD AND APPARATUS FOR MULTI-INPUT MULTI-OUTPUT COMMUNICATIONS OVER PER-TRANSMITTER POWER-CONSTRAINED CHANNELS

(71) Applicant: Mai Vu, Belmont, MA (US)

(72) Inventor: Mai Vu, Belmont, MA (US)

(73) Assignee: Trustees of Tufts College, Medford, MA (US)

( * ) Notice: Subject to any disclaimer, the term of this patent is extended or adjusted under 35 U.S.C. 154(b) by 0 days.

(21) Appl. No.: 13/910,093

(22) Filed: Jun. 4, 2013

(65) Prior Publication Data
US 2014/0153657 A1 Jun. 5, 2014

Related U.S. Application Data

(60) Provisional application No. 61/655,011, filed on Jun. 4, 2012, provisional application No. 61/830,328, filed on Jun. 3, 2013.

(51) Int. Cl.
*H04L 27/26* (2006.01)
*H04B 7/04* (2006.01)
*H04L 25/03* (2006.01)

(52) U.S. Cl.
CPC ......... *H04B 7/0465* (2013.01); *H04L 25/0391* (2013.01)

(58) Field of Classification Search
CPC .............. H04B 7/043; H04B 7/0617; H04B 7/0465; H04B 7/0626; H04B 7/0456
See application file for complete search history.

(56) References Cited

U.S. PATENT DOCUMENTS

| | | | |
|---|---|---|---|
| 6,101,399 A | 8/2000 | Raleigh et al. | |
| 6,185,258 B1 | 2/2001 | Alamouti et al. | |
| 6,873,651 B2 | 3/2005 | Tesfai et al. | |
| 7,099,678 B2 | 8/2006 | Vaidyanathan | |
| 7,133,459 B2 | 11/2006 | Onggosanusi et al. | |
| 7,158,493 B1 | 1/2007 | Uhlik et al. | |
| 7,194,237 B2 | 3/2007 | Sugar et al. | |
| 7,206,354 B2 | 4/2007 | Wallace et al. | |
| 7,237,115 B1 | 6/2007 | Thomas et al. | |
| 7,269,436 B2 | 9/2007 | Won | |
| 7,295,636 B2 | 11/2007 | Onggosanusi et al. | |
| 7,298,717 B2 | 11/2007 | Hui et al. | |
| 7,672,389 B2 * | 3/2010 | Gueguen ............... | H04L 1/0643 375/267 |
| 7,680,212 B2 | 3/2010 | Vu et al. | |

(Continued)

OTHER PUBLICATIONS

Yu et al. "Transmitter Optimization for the Multi-Antenna Downlink With Per-Antenna Power Constraints", Jun. 2007, IEEE, pp. 2646-2660.*

(Continued)

*Primary Examiner* — Sophia Vlahos
(74) *Attorney, Agent, or Firm* — Bergman & Song LLP; Michael Bergman

(57) ABSTRACT

A multipath communication system forms a complex weighted compound signal for transmission through a channel environment wherein the compound signal includes a complex variable weighted compound signal related to a count of available antennas, a power constraint related to each said antenna, and a channel state characteristic.

3 Claims, 17 Drawing Sheets

(56) References Cited

U.S. PATENT DOCUMENTS

| | | | |
|---|---|---|---|
| 7,889,805 B2 | 2/2011 | Kim et al. | |
| 8,213,533 B2 * | 7/2012 | Hafeez | 375/295 |
| 8,374,155 B2 | 2/2013 | Koo et al. | |
| 8,385,861 B2 * | 2/2013 | Ohwatari et al. | 455/127.2 |
| 8,483,310 B2 * | 7/2013 | Coldrey et al. | 375/295 |
| 2003/0157954 A1 * | 8/2003 | Medvedev et al. | 455/522 |
| 2009/0046570 A1 | 2/2009 | Sarkar et al. | |
| 2012/0243631 A1 * | 9/2012 | Gaur | 375/267 |

OTHER PUBLICATIONS

T. Cover and J. Thomas, *Elements of Information Theory*, 2nd ed. John Wiley & Sons, Inc., 2006.

I. Telatar, "Capacity of multi-antenna Gaussian channels," *European Transactions on Telecommunications*, vol. 10, No. 6, pp. 585-595, Nov. 1999.

W. Yu, W. Rhee, S. Boyd, and J. Cioffi, "Iterative water-filling for Gaussian vector multiple-access channels," *Information Theory, IEEE Transactions on*, vol. 50, No. 1, pp. 145-152, 2004.

W. Yu and T. Lan, "Transmitter optimization for the multi-antenna downlink with per-antenna power constraints," IEEE Transactions on Signal Processing, vol. 55, No. 6, pp. 2646-2660, Jun. 2007.

M. Codreanu, A. Tolli, M. Juntti, and M. Latva-Aho, "MIMO downlink weighted sum rate maximization with power constraints per antenna groups," In *IEEE VTC Spring*, 2007, pp. 2048-2052.

S. Shi, M. Schubert, and H. Boche, "Per-antenna power constrained rate optimization for multiuser MIMO systems," in International ITG Workshop on Smart Antennas (WSA), 2008, pp. 270-277.

J. Yang and D. K. Kim, "Multi-cell uplink-downlink beamforming throughput duality based on lagrangian duality with per-base station power constraints," Communications Letters, IEEE, vol. 12, No. 4, pp. 277-279, 2008.

M. Vu, "MISO Capacity with Per-Antenna Power Constraint," IEEE Trans. on Communications, May 2011.

R. Zhang, "Cooperative multi-cell block diagonalization with per-base-station power constraints," Selected Areas in Communications, IEEE Journal on, vol. 28, No. 9, pp. 1435-1445, 2010.

Hao Zou, Aakanksha Chowdhery, John M. Cioffi .; A Centralized Multi-Level Water-Filling Algorithm for Dynamic Spectrum Management; IEEE Conference Publications; Signals, Systems and Computers, 2009 Conference Record of the Forty-Third Asilomar Conference on Nov. 1-4, 2009; Pacific Grove, CA; pp. 1101-1105.

Xia Liu and Marek E. Bialkowski, "Optimization of Training Signal Transmission for Estimating MIMO Channel under Antenna Mutual Coupling Conditions," International Journal of Antennas and Propagation, vol. 2010, Article ID 213576, 10 pages, 2010. doi:10.1155/2010/213576.

Rui Zhang; Cooperative multi-cell block diagonalization with per-base-station power constraints; IEEE Journal on Selected Areas in Communications—Special issue on cooperative communications in MIMO cellular networks; vol. 28 Issue 9, Dec. 2010; pp. 1435-1445.

\* cited by examiner

Convergence comparison for a 3 x 3 channel at SNR = -5dB, $\epsilon = 10^{-6}$ and random starting point $D_0$ Convergence statistics based on 1000 independent realizations for each channel size, SNR = -5dB, $\epsilon = 10^{-6}$ (left: our proposed algorithm; right: comparison with the algorithm in [9])

| number of receive antennas m | 2 | 3 | 4 | 6 | 8 | 10 |
|---|---|---|---|---|---|---|
| non-convergence cases for n = m | 72 | 124 | 95 | 587 | 961 | 1000 |
| non-convergence cases for n = 2m | 504 | 523 | 647 | 739 | 877 | 933 |

TABLE I
NUMBER OF NON-CONVERGENT CASES (OUT OF 1000) FOR THE ALGORITHM IN [9].

FIG. 14

SYSTEM, METHOD AND APPARATUS FOR MULTI-INPUT MULTI-OUTPUT COMMUNICATIONS OVER PER-TRANSMITTER POWER-CONSTRAINED CHANNELS

Cross-Reference to Related Applications

This application claims the benefit of U.S. provisional patent application No. 61/655,011 filed on Jun. 4, 2012, and of U.S. provisional patent application No. 61/830,328 filed on Jun. 3, 2013, the disclosures of which is herewith incorporated by reference in their entireties. Where mathematical or other notation is in conflict between the present disclosure and the provisional patent applications and/or between and among the same, the provisional applications shall be considered authoritative with the '328 application being considered to supersede the '011 application.

Field of the Invention

The present invention relates to the data communications, and more particularly to multipath data communications.

Summary

Having examined and understood a range of previously available devices, the inventor of the present invention has developed a new and important understanding of the problems associated with the prior art and, out of this novel understanding, has developed new and useful solutions and improved devices, including solutions and devices yielding surprising and beneficial results. The invention encompassing these new and useful solutions and improved devices is described below in its various aspects with reference to several exemplary embodiments including a preferred embodiment.

The principal advantage of a MIMO system is that it allows the concurrent transmission of local data streams so as to increase the robustness and effective data rate of a system as a whole. A variety of approaches are used to effect this concurrent transmission including the transmission of orthogonal signals and the transmission of data signals over spatially distinct paths. In a radio frequency wireless implementation, MIMO communications is typically effected by transmitting signals concurrently from several antennas of an array. Reception often includes receiving the concurrently transmitted signals at a receiving array, where the receiving array also includes several antennas.

The present invention relates to improving communications in a multipath communications system, and more particularly in a multi-input-multi-output (MIMO) communications system. In particular, the present invention provides communications in a multi-input multi-output (MIMO) communications system where transmission power is constrained on a per-transmitter basis.

Generally speaking, power is distributed to the antennas of an array according to a "water-filling algorithm" which allocates power on the basis of the eigenmodes of a particular multipath channel, and considering only a total power constraint among all the transmitters. Under such an approach, power is allocated to individual transmitter devices of a transmitter array according to the requirements of a desired radiation pattern, and assuming a capacity of each individual transmitter device to handle the corresponding power requirements. This is recognized as an approximate approach based on idealization of the transmitter devices, and there has been a long felt need among practitioners of in the art for an improved approach. This long felt need has remained unsatisfied, however, in the face of technical challenges, which are now over, the present invention.

The inventor has come to understand, however, that by applying the invention disclosed herewith, it is possible to identify a maximum average power constraint for each antenna of a plurality of transmit antennas. Thereafter, it is possible to provide power on a practical basis that approaches and/or is substantially equivalent to that value with highly beneficial results. This is especially true where, as in the present invention, an appropriate application of complex weighting values to incoming various signal components results in a dynamically adjustable optimal spatial distribution of transmit power. In effect, under certain embodiments of the present invention, customized power is applied to each of as plurality of antennas according to a per-antenna power constrained, and the total power output is steered into one or more beams on an optimized dynamic basis, based on the more or less instantaneous characteristics of the channel (including short term and long term statistics of the channel).

Accordingly, under the present invention, there is no assumption of power handling capacity implicit in the signal allocation process as to the characteristics of signals that individual transmitter devices are to produce. That is, there is not necessarily a single power budget to be shared among a finite array of antennas. Rather, information is acquired as to the actual power handling capacity (and, where appropriate, any other relevant characteristics) of a particular transmitter device. Signal allocation is optimized according to the actual capabilities of each transmitter device. In this way, beam formation, signal transmission redundancy, and data rate improvements are achieved.

Of further interest is the face that, in exemplary embodiments of the invention, either or both of the transmitting and receiving antenna arrays are readily reconfigurable. Indeed, where an appropriate standard is established for communicating identity and antenna power constraints an array can be formed on a dynamic ad hoc basis such that otherwise unrelated antennas can be configured as a spatially extensive array where the ownership and control of the individual antennas may be diverse. Thus, for example, a large number of individual transmitter devices including, for example, transmitter devices associated with discrete cellular telephones, personal digital assistants, laptop computer, desktop computers, wireless routers, base stations, relay base stations, femtocells, WiFi access points etc., can be manually or automatically configured to operate as an ad hoc communication antenna array of large spatial extent based on prior implicit or explicit agreements and authorization to participate supplied by the respective users on the individual devices. Because it is readily configured to receive and adapt to the power constraints of each communication antenna, along with its respective modulation and amplification apparatus, a communication system according to principles of the present invention is uniquely capable of developing and employing this and other novel antenna arrangements.

In light of the resident disclosure, one of skill in the art will immediately recognize the remarkable and surprising advantages of such an ad hoc antenna array. Because the characteristics of the individual transmitter device are available and accounted for, transmitters of varying characteristics can be employed together.

Moreover, the transmitters that happen to be available within a particular spatial environment can provide capacity that would otherwise be unavailable. Thus, for example, a large number of communications units such as cellular telephones, personal digital assistant devices, laptop computers, desktop computers, wireless routers, televisions, radios, walkie-talkies, and other apparatus that include transmitter devices will be present in a typical office budding. In light of the present invention, one of skill in the art will appreciate that a sharing protocol can be established whereby individual communications units can self identify, or be detected, as present within an operative spatial region (i.e. a spatial region within which communication units are capable of cooperating or allowed to cooperate).

Depending on the specifics of a particular protocol, this self identification will allow a transmitter to acquire the relevant characteristic information for any appropriate number of the available communication units. On the basis of this characteristic information, a respective properly weighted composite signal will be conveyed from the transmitter to each communication unit. Each such communication unit, on receiving the respective composite signal will transmit that signal at an operative power level optimized (and in most cases maximized) according to the characteristics of the individual transmitter device so as to achieve the highest possible data rate.

This approach provides the transmitter with immediate access in the power resources of a large number of communication units. At the same time, the transmitter is not limited by the power constraints of any particular one of the large number of communication units. Rather, the power demands made on any communication unit are moderated by the known value of that unit's transmitter power constraint.

Moreover, the individual transmitter devices are potentially distributed over spatial area that will be vast by comparison to the size of a typical conventional transmitter. Thus, for example, a single cell phone may have effective access to an ad hoc transmission array capable of transmitting at power levels many orders of magnitude above the transmission power available to the cell phone, and from an array of antennas is likewise many orders of magnitude larger than the cell phone itself.

Moreover, depending on the communication and synchronization capabilities of the individual communication units, it will be possible to form an ad hoc communication array that includes an extended network of communication units where information is passed on peer-to-peer, or other, basis between communication units. In this way, signals can be conveyed from the transmitter to an individual communication unit that is beyond the direct communications range of any transmitter device within the transmitter itself.

In particular limitations of the invention, individual communication units will join and depart from the ad hoc array on a stochastic basis, according to the movements of various individuals who may control those communication units, and according to the other requirements placed on those units. According to various embodiments, these joining and departing activities, along with the requisite calculations and reallocation of signal content will be handled on an automatic basis according to a pre-agreed protocol. It will be understood that a wide variety of such protocols and arrangements, including any requisite software and hardware, will fall within the scope of the present invention as conceived and disclosed here.

Naturally, it will be appreciated that while the discussion above relates to a transmitter, a symmetrical arrangement can be employed with respect to a receiver. In addition, it will be understood by one of skill in the art, that the present invention is not limited to cell phones or any other personal communication unit, but will also have applications in their wide variety of other communications fields. Indeed, principles of the invention will readily be applied in such diverse fields as, for example, optical and radio astronomy, acoustical event monitoring, undersea communications and imaging, inventory tracking, optical waveguides, such as optical fibers, a digital subscriber line (DSL) communication system or other wired communication system and other fields equally diverse in nature and complexity.

One of skill in the art will thus understand that the present invention offers the opportunity to maximize the consolidated information transmission rate subject to individual power constraints applied on a per-antenna basis where, in the idealized situation of perfect Channel State Information at the Transmitter (CSIT) one may realize:

$$\max \log \det (I_m + HQH^\dagger)$$

$$\text{subject to} e_i^T Q e_i <= P_i, i=1 \ldots n$$

$$Q \succ \approx 0$$

where with $e_i^T Q e_i <= P_i$, with ei=[0 . . . 1 . . . 0]T as a vector with the $i_{th}$ element equal to 1 and the rest are 0, refers to the power constraint at the ith antenna and Q is Hermitian.

By way of notational convention, throughout this disclosure, matrices will be presented in bold font and the presence of an inverted hat over a matrix variable, e.g., "$\check{H}$" will identify the inverse or pseudo-inverse of the corresponding matrix "H."

The specification and drawings are to be considered along with the claims, but only for purposes of enabling proper construction of the claims. As such, the figures provided herewith should in no way be considered limiting. Nor should any one figure necessarily be deemed to encompass every aspect of any particular embodiment of the invention. Rather, the figures should be considered together to show various aspects of the invention in its varied embodiments including a preferred embodiment. Accordingly, the various attached figures can be construed as various aspects, or views, of a particular embodiment of the invention. As such, it will be understood that the invention disclosed and defined herein extends to all alternative combinations of two or more of the individual features mentioned or evident from the drawings and/or text.

All of these different combinations constitute various alternative aspects of the invention. Any attempt to limit the invention, or any embodiment thereof, to those aspects presented in as particular figure or subset of figures would be contrary to the intention of the inventor and improperly limiting. Rather, the invention can be modified to incorporate any number of variations, alterations, substitutions, or equivalent arrangements not heretofore described, but which are commensurate with the spirit and scope of the invention. Accordingly, the invention is not to be seen as limited by the drawings, but is only limited by the scope of the appended claims.

BRIEF DESCRIPTION OF THE DRAWINGS

FIG. 14 shows, in tabular form, simulation results related to experimental simulation of a system and method for multipath communication of information according to principles of the invention.

DETAILED DESCRIPTION

The following description is provided to enable any person skilled in the art to make and use the disclosed inventions and sets forth the best modes presently contemplated by the inventors of carrying out their inventions. Having examined and understood a range of previously available devices, the inventor in the present invention has developed a new and important understanding of the problems associated with the prior art and, out of this novel understanding, has developed new and useful solutions and improved devices, including solutions and devices yielding surprising and beneficial results. The invention encompassing these new and useful solutions and improved devices is described below in its various aspects with reference to several exemplary embodiments including a preferred embodiment. In the following description, for purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the substance disclosed.

Figure 1:
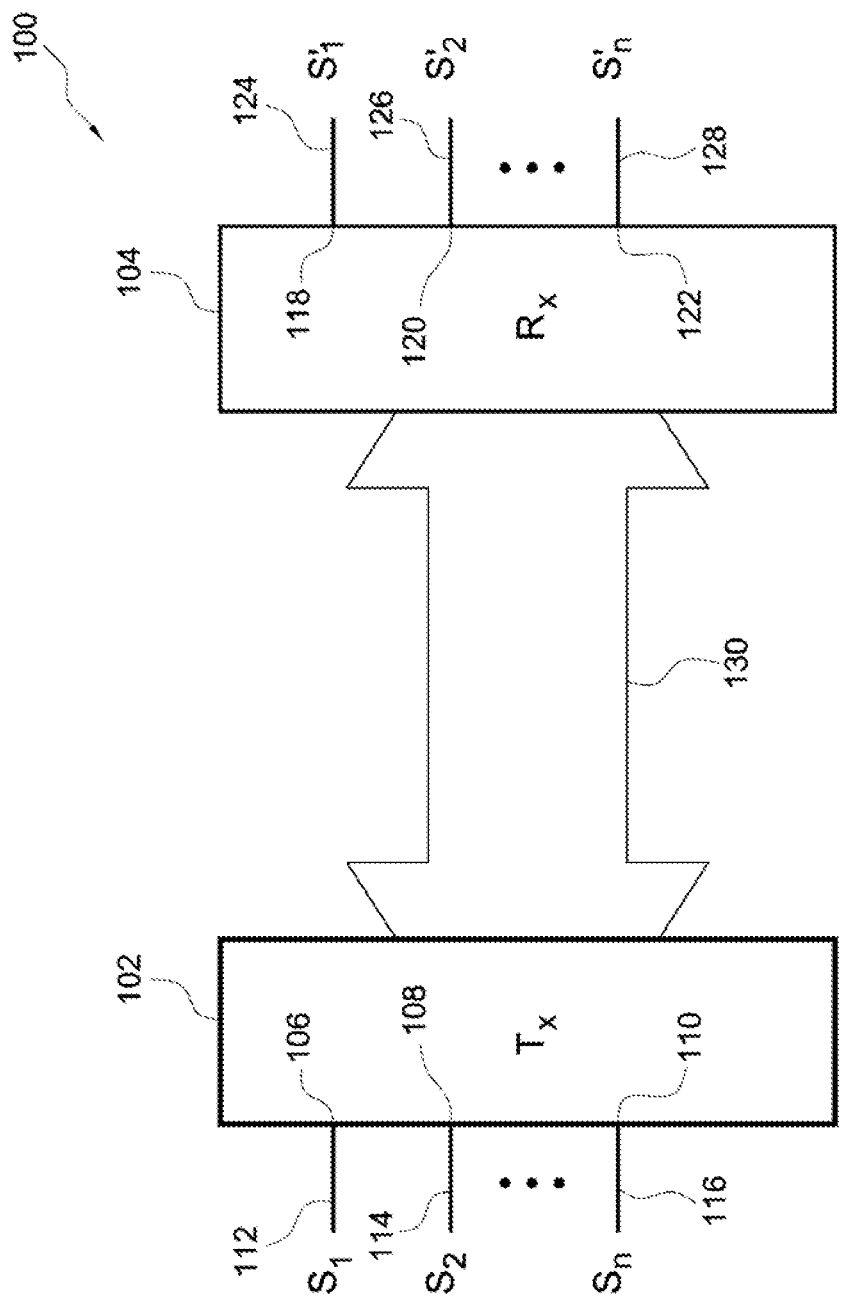
FIG. 1 shows, in schematic block diagram form, certain aspects of an exemplary system and apparatus for multipath communication of information according to principles of the invention.

FIG. 1 shows, in schematic block diagram form, a portion of an exemplary multipath wireless communication system 100. The illustrated multipath communication system includes a transmitter subsystem 102 and a receiver subsystem 104. The practitioner of ordinary skill will understand that this representation is made for simplicity, and that one or both of the transmitter subsystem 102 and the receiver subsystem 104 may be representative of respective transceiver subsystems.

The transmitter subsystem 102 includes a plurality of input nodes e.g., 106, 108, 110, configured to receive respective input signals 112, 114, 116. For purposes of this disclosure, input signals, e.g., 112, 114, 116 may be considered functionally independent of one another. The receiver subsystem 104 includes a plurality of output nodes e.g., 118, 120, 122, configured to produce respective output signals, e.g., 124, 126, 128. Output signals 124, 126, 128 are substantially related to input signals 112, 114, 116 respectively, typically according to an estimation relationship.

According to the present invention, information related to each of the input signals is transmitted from the transmitter 102 to the receiver 104 by way of a multipath communication channel 130. The transmitter 102 and receiver 104 will include any of a wide variety of transmitters and receivers for coupling to and from the multipath communication channel 130. In an exemplary arrangement, the multipath communication channel includes an evacuated region of space, and/or a region of space including one or more dielectric materials.

Correspondingly, the transmitter 102 includes, transmitting devices including a plurality of transmitting antennas and the receiver 104 includes a plurality of receiving devices including a plurality of receiving antennas. Each of the antennas will, in such an exemplary application, be configured for the free-space communication of radio frequency signals, microwave signals, extremely low frequency signals, or any other electromagnetic signal appropriate to a particular application. As will be further discussed below, according to principles of the invention, the various transmitters and receivers, and related equipment, need not be identical to one another in their physical or operational characteristics. Thus, for example, the maximum average power transmitted from a particular transmitting antenna need not be the same as the maximum average power transferred from another signal transmitting antenna of the same embodiment.

As an exemplary alternative, multipath communication channel 130 will include a plurality of optical waveguides, such as optical fibers. Corresponding coupling apparatus in such an embodiment may include optical emitters and detectors associated with the transmitter and receiver respectively. It will be understood that any reference throughout this disclosure to optical wavelengths will be intended to include one or more of visible and invisible spectrum wavelengths.

As a further exemplary alternative, multipath communication channel 130 will include a plurality of electrical conductors arranged, for example, as a digital subscriber line (DSL) communication system or other wired communication system. As a still further exemplary alternative, multipath communication channel 130 will include a plurality of acoustical emitters and acoustical detectors configured to couple respectively to an acoustically conductive medium. One of skill in the art will appreciate that the foregoing examples are merely illustrative of a wide variety of communications apparatus that may be employed alone or in combination to realize a multipath communication channel 130.

As will be further discussed below, according to principles of the invention, the characteristics of multipath communication channel 130, and those of the various coupling apparatus, are adaptable modeling and control for purposes of optimizing the transmission of information over the communication channel 130.

Figure 2:
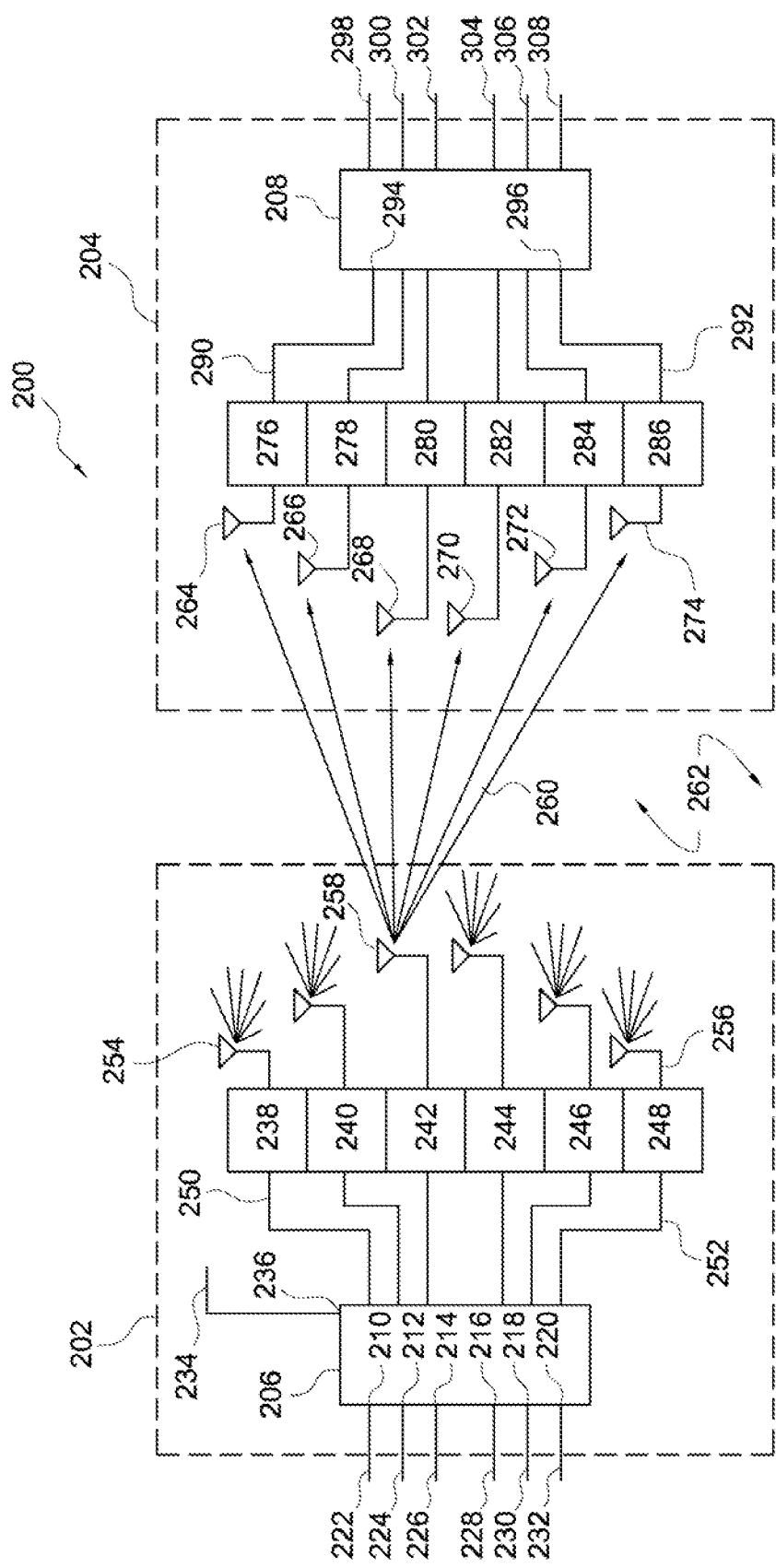
FIG. 2 shows, in schematic block diagram form, further aspects of an exemplary system and apparatus for multipath communication of information according to principles of the invention.

FIG. 2 shows, in schematic functional representation, additional detail regarding a system and method according to principles of the invention. In particular, a multipath communication system 200 includes a transmitter 202 and a receiver 204. Transmitter 202 includes a pre-coder device 206 with a plurality of signal inputs, e.g., 210, 212, 214, 216, 218, 220. The plurality of signal inputs are arranged to receive respective independent information signals 222, 224, 226, 228, 230, 232. One of skill in the art will appreciate that, while individual nodes are illustrated in FIG. 2 for receiving the independent signals, other arrangements, such as receiving a multiplex signal at a single individual node are also intended to be within the scope of this disclosure.

In addition, decoder 206 receives channel state information 234. In the illustrated example embodiment, channel state information is received at a further input node 236. One of skill in the art will appreciate, however, that channel state information may be received at a plurality of input nodes, and/or by way of input apparatus that is not dedicated to receiving channel state information.

Transmitter 202 also includes a plurality of transmission devices 238, 240, 242, 244, 246 and 248. In a typical implementation, the transmission devices will include respective carrier frequency generation and modulation apparatus as well as a power amplification device. Accordingly, each of the plurality of transmission devices receives a respective pre-coded signal, e.g., 250, 252 from the pre-coder device 206 and outputs a corresponding modulated carrier signal to a respective transmitting antenna device, e.g., 254, 256, 258. The modulated carrier signals produce respective radiated signals e.g., 260 which traverse an intervening channel region 262 and are coupled to a plurality of receiving antenna devices, e.g., 264, 266, 268, 270, 272, 274.

As will be discussed in additional detail below, and according to principles of the invention, the characteristics of each transmission device and its associated antenna device will, in certain embodiments, be independent of the characteristics of the other transmission devices and antennas of the transmitter 202. The various parameters characterizing each transmitter device e.g., 238 and antenna device e.g. 254 will be available to the pre-coder device 206. Based on these parameters, and on channel information 234, the pre-coder device will produce pre-coded signals 250, 252 that each include a weighted combination of the independent input signals to 22, 224, 226, 228, 230, 232.

It should be noted that the modulated carrier signal broadcast by each transmitting antenna device, e.g., 258, may be received at a plurality of receiving antenna devices 264, 266, 268, 270, 272, 274. In like fashion, each receiving antenna device, e.g. 264, may receive modulated carrier signals produced by all or fewer than all of the transmitting antenna devices, e.g., 254, 256, 258. It should also be noted that the number of transmitting and receiving antenna devices need not be equal. In particular applications of the invention, an excess of transmission antenna devices may transmit to fewer receiving antenna devices. Conversely, an excess of receiving antenna devices may receive signals from fewer transmitting antenna devices.

The receiving antenna devices are respectively coupled to receiving antennas 276, 278, 280, 282, 284 and 286, and include respective devices to receive the incoming signals received from the receiving antennas. The receiving antennas produce corresponding information signals e.g., 288, 290 which are received at respective inputs, e.g., 294, 296, of decoder device 208. Decoder device 208 responsively produces independent signals 298, 300, 302, 304, 306, 308 having information content that corresponds to input signals 222, 224, 226, 228, 230 and 232 respectively.

Figure 3:
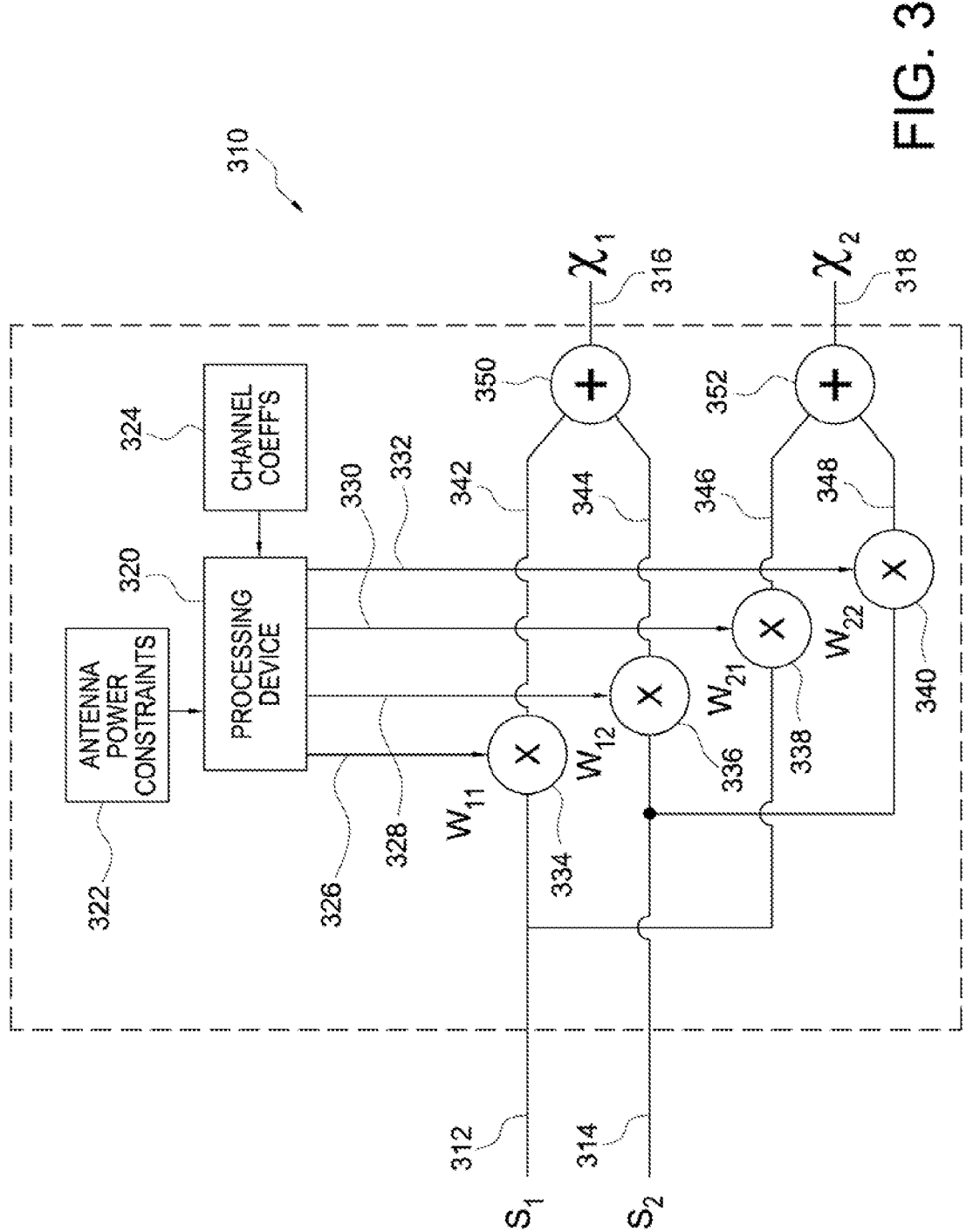
FIG. 3 shows, in schematic block diagram form, additional detail regarding a portion of a system and apparatus for multipath communication of information according to principles of the invention.

FIG. 3 shows, in schematic block diagram form, additional detail as to the construction and operation of a pre-coder device 310 according to principles of the invention. For simplicity, pre-coder device 310 is configured to accept two independent inputs 312, 314 and produce two encoded outputs 316, 318. One of skill in the art will appreciate that, while two inputs and two outputs are discussed here for simplicity of explanation, any number or inputs and outputs will be employed according to the requirements of a particular application.

As illustrated, the pre-coder device 310 includes a processing unit 320 that is arranged to acquire a first signal 322 that represents power constraints associated with the various parameters of transmitter devices and antennas, or other coupling devices, by which the output signal 316, 318, are to be coupled to a multipath communication channel. The processing unit 320 is also arranged to receive a second signal 324 that represents channel coefficients characterizing the state of the multipath communication channel. In response to these inputs, the processing device 320 produces complex signal weighting factors 326, 328, 330, 332 which are received at respective multiplier devices 334, 336, 338, 340.

As indicated, multiplier devices 334 and 338 also receive input signal 312 and multiplier devices 336 and 340 also receive input signal 314. Respective output signals 342, 344, of multiplier devices 334 and 336 are received at an adder device 350. Likewise, respective output signals 346, 348 of multiplier devices 338, 340 are received at adder device 352. Adder device 350 produces precoded signal 316. Adder device 354 produces precoded signal 318. Each of precoded signals 316 and 318 includes weighted linear combinations of the independent input signals 312, 314. This redundancy increases the robustness of transmission over the multipath communication channel.

In addition, precoded signals 316 and 318 embody phase and amplitude information derived from the input antenna power constraints 322 and channel coefficients 324. Consequently, in certain embodiments of the invention, the coupling of signals 316 and 318 to a corresponding multipath transmission channel will result in a radiation pattern including one or more beams to which transmission power and signal composition is dynamically allocated according to the weighting factors 326, 328, 330 and 332. Accordingly, although, in certain applications, transmission power per antenna will be effectively fixed at a maximum average power level, allocation of power per beam will be dynamically variable according to the dynamically changing characteristics of the channel.

One of skill in the art will appreciate that the functional combination of independent input signals 312, 314 with antenna power constraint 322 parameters and channel coefficients 324 will be achieved by a variety of methods and apparatus according to the requirements and constraints of a particular embodiment. Thus, in certain embodiments, processing device 320 will include a Von Neuman style digital processing unit such as at microprocessor or microcontroller. In other embodiments, processing device 320 will include a dedicated digital logic device implemented, for example, as one or more custom integrated circuits and/or one or more programmable logic arrays. Instill other embodiments, processing device 320 will include an analog processing device and/or a quantum computing device and/or any other appropriate processing device such as is known or may become known in the art.

In addition, while certain embodiments of the invention will effect the calculation and communication of weighting factors 326, 328, 330 and 332 as elements of a complex valued matrix, other embodiments will provide for the calculation and communication of the corresponding information from the processing device in the form of independent phase and amplitude signals, or in any other appropriate fashion. Furthermore, while multiplication and addition functions are shown as discreetly localized devices in FIG. 2, one of skill in the art will appreciate that the corresponding functions will be executed within the processing device on digitized versions of the independent input signals in corresponding embodiments of the invention. It should be understood that all such implementations of the disclosed functionality are considered to be within the scope of the present disclosure.

As noted above, one exemplary method for allocating power, signal composition and data rate to a particular pattern of radiation (i.e., beam pattern) produced by a plurality of antennas involves the calculation and application of a matrix W of complex weighting factors. For expository purposes, exemplary procedures are described herewith for controlling apparatus that effects a desirable communication of information by calculating and applying certain complex weighting factors according to principles or the invention.

Figure 4A:
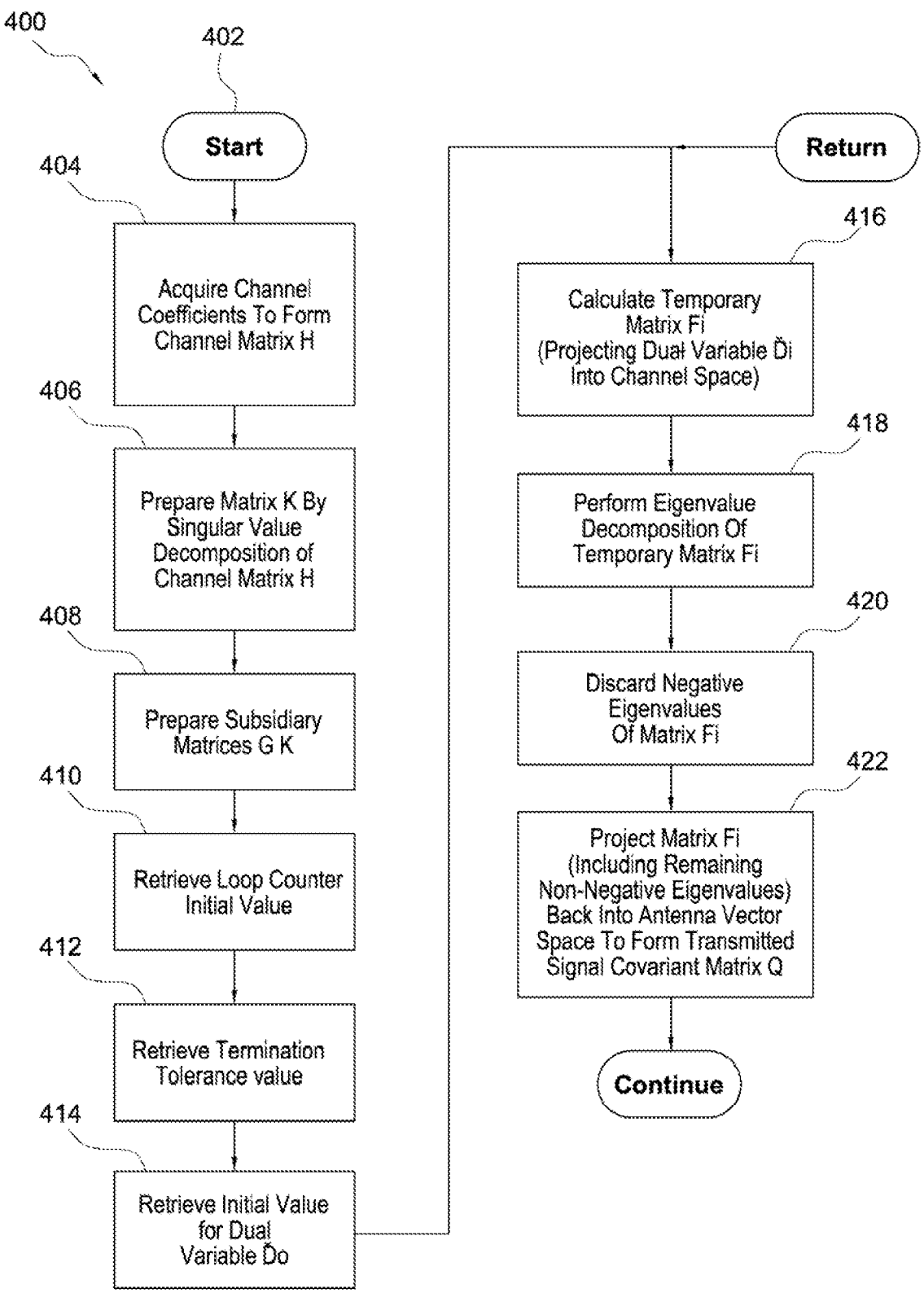
FIG. 4A illustrates, in schematic flow diagram form, a portion of a communication method according to principles of the invention.
Figure 4B:
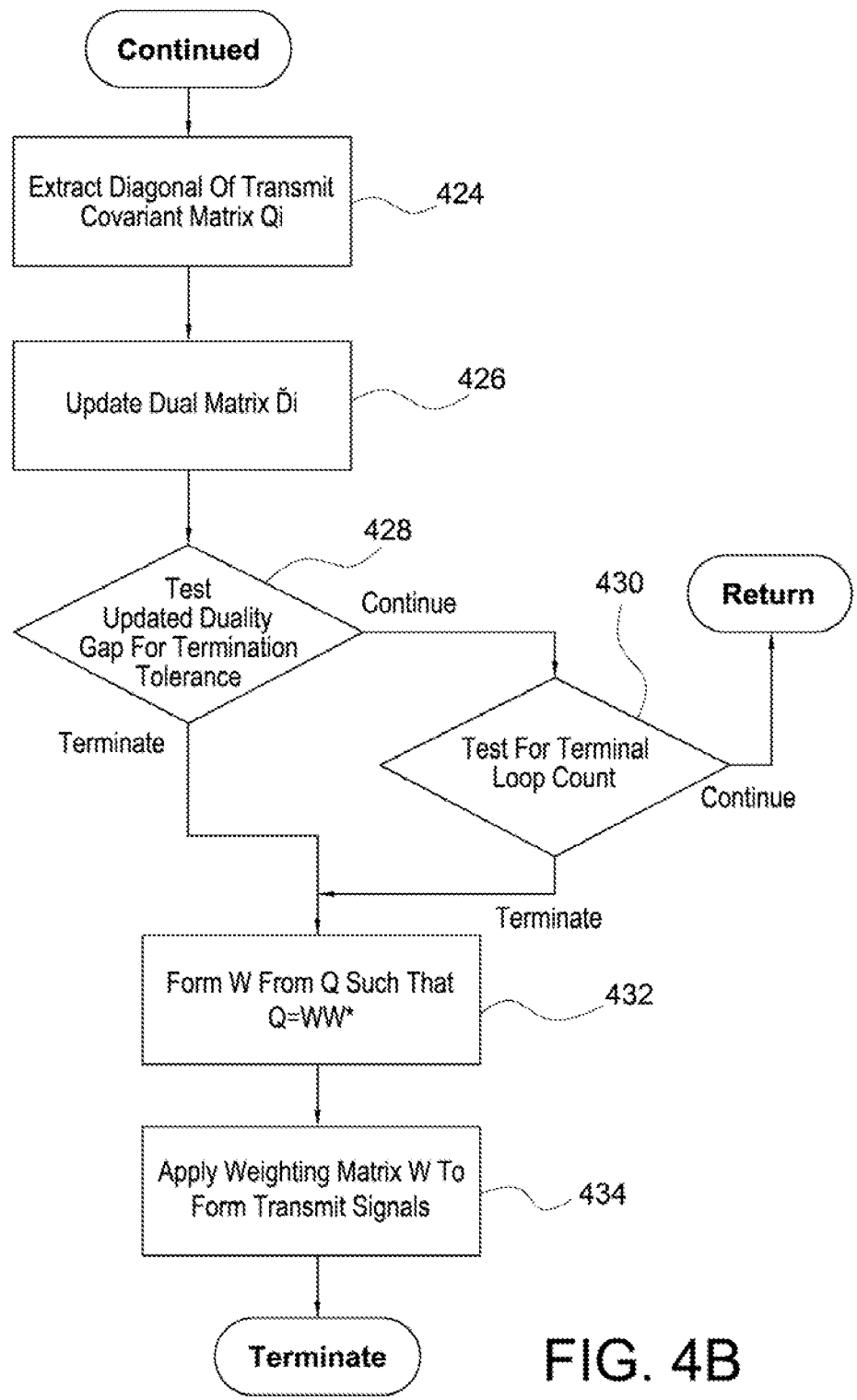
FIG. 4B illustrates, in schematic flow diagram form, another portion of a communication method according to principles of the invention.

FIGS. 4A and 4B visualize, in graphical flowchart form, process steps 400 for producing and applying control parameters for a multipath communication system having a first plurality of transmission antennas and a second plurality of reception antennas where the number of transmission antennas is less than or equal to the number of reception antennas. It should be noted that, while the present example is characterized in terms of radio frequency communications and antennas, as previously noted, the present invention can be applied equally well to a wide variety of other communication systems.

The control parameters are designated here, for convenience, as elements of a complex matrix W, so as to exploit a particular communication channel characterized, according to various measurement techniques, by a matrix H of complex numerical values. It will be understood that, in various applications, the characteristics of the communication channel will be dynamic (i.e., time variable) according to the influence of a wide variety of physical inputs including, for example, atmospheric conditions, interference, fading, motions of transmitting and receiving antennas and of other features of the channel environment, it will be appreciated that process 400 can be executed on a periodic and/or occasional basis depending on the degree to which channel characteristics are anticipated to change, or sensed to be changing.

The illustrated process 400 begins 402 with the characterization of a current state of the physical channel. This characterization includes acquiring channel coefficients to form a channel matrix H 404. It will be understood that channel coefficients are to be represented for operational convenience as complex vectors in a complex vector space. The values of the channel matrix H can be acquired in a wide variety of known, and to be discovered, methods including, for example, the evaluation of a pilot signal and subsequent receipt by the transmitter a a corresponding feedback signal, and/or the evaluation of reciprocal information based on received general information signals.

As a further step in channel characterization, a matrix K is prepared 406 by the singular value decomposition of channel matrix H. Based on matrix K, further subsidiary matrices $\check{G}$ and $\check{K}$ are produced 408, where $\check{K}=K^{-1}$ and $\check{G}=\check{K}\check{K}^{\dagger}$.

The further development of matrix W proceeds by an iterative process. Thus, in further steps, as counter variable i is initialized 410. This counter variable is used to set a maximum number of iterations and, effectively, a maximum calculation time for the preparation of a particular matrix W. A termination tolerance variable $\epsilon$ is also initialized 412. Termination tolerance variable $\epsilon$ stops the iterative process once acceptable intermediate values have been achieved, thereby avoiding unnecessary processing cycles.

An initial matrix $\check{D}_0$ is acquired 414. $\check{D}_0$ will have any arbitrary diagonal value $\check{D}_0 > 0$. Typically, $\check{D}_0$ will be acquired as a value stored in encoded form in a memory device. Where channel characteristics are known in advance, this value may be selected to minimize the processing cycles necessary. Moreover, in certain embodiments, an optimal value of $\check{D}_0$ calculated in one operation of the process 400 will be stored and recovered as an initial value $\check{D}_0$ for a subsequent operation of the process 400.

Thereafter, a temporary matrix F is calculated 416 for a first iteration of the optimization process. F is calculated as:

$$F_i = K\check{D}_i\check{K} - I_n$$

and thus embodies the number of antennas, the per antenna power constraint, and channel state. One of skill in the art will appreciate that K represents the effective channel seen by a transmitter.

Thereafter, eigenvalue decomposition of temporary matrix F is performed:

$$F_i = U_F \Lambda U_F^\dagger$$

Thereafter discard non-positive eigenvalues of matrix $F_i$ 420—first determining the number of non-positive eigenvalues of $F_i$ and thereafter form matrix $S_i$ where $$S_i = -U_F^k \Lambda_F^k U_F^{k\dagger}$$

and where
$\Lambda_F^k$ is the k×k diagonal matrix of all k non-positive eigenvalues of $F_i$
and where
$U_F^k$ consists of the corresponding k eigenvectors One of skill in the art will appreciate that although non-positive eigenvalues of matrix $F_i$ represent directions in which communication could proceed, the efficiency of communication in those directions is insufficient to justify allocation of power according to the corresponding eigenvalues Thereafter form transmitted signal covariant matrix $Q_i$ 422, first forming matrix $Z_i$ where $$Z_i = \check{K}S_i\check{K}^\dagger$$

Thereafter, extract diagonal of covariant matrix $Q_i$ 424

$$Q_i = \check{D}_i - \check{G} + Z_i = \check{K}(F-S_i)\check{K}^\dagger$$

Thereafter, update dual variable $\check{D}_i$ 426

$$\check{D}_{i+1} = \check{D}_i - P\text{-diag}(Q_i)$$

Thereafter, evaluate termination tolerance by calculating the duality value $\Delta$ 428 where $$\Delta = |tr[\check{D}_i(Q_i - P)]|$$

and comparing $\Delta$ to termination tolerance $\epsilon$. If termination tolerance has been exceeded, proceed to formation of W matrix at step 432. Otherwise, increment loop counter i and test for terminal iteration count. If terminal iteration count has been exceeded, proceed to formation of W matrix at step 432 otherwise proceed with further iteration.

Upon achieving either termination criterion, form W matrix from $Q_i$ at step 432, where, for example, $$Q_i = WW^*$$

$$Q_i = U_Q \Lambda U_{Q^*}$$

$$W = U_Q \Lambda^{1/2}$$

Thereafter, apply elements of matrix W by multiplication with independent input signals as indicated in relation to FIG. 2 above.

Figure 5A:
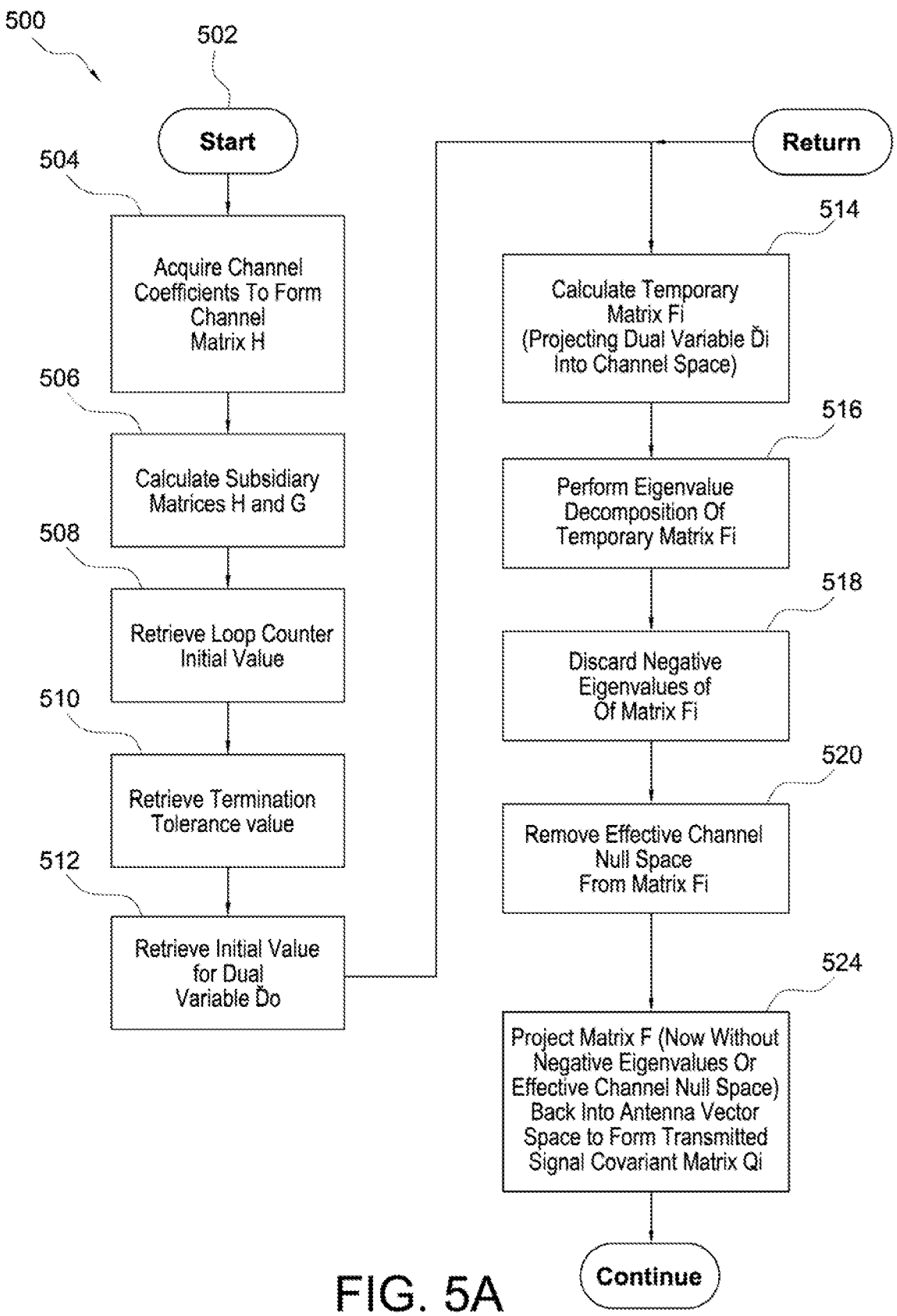
FIG. 5A illustrates, in schematic flow diagram form, a portion of a communication method according to principles of the invention.
Figure 5B:
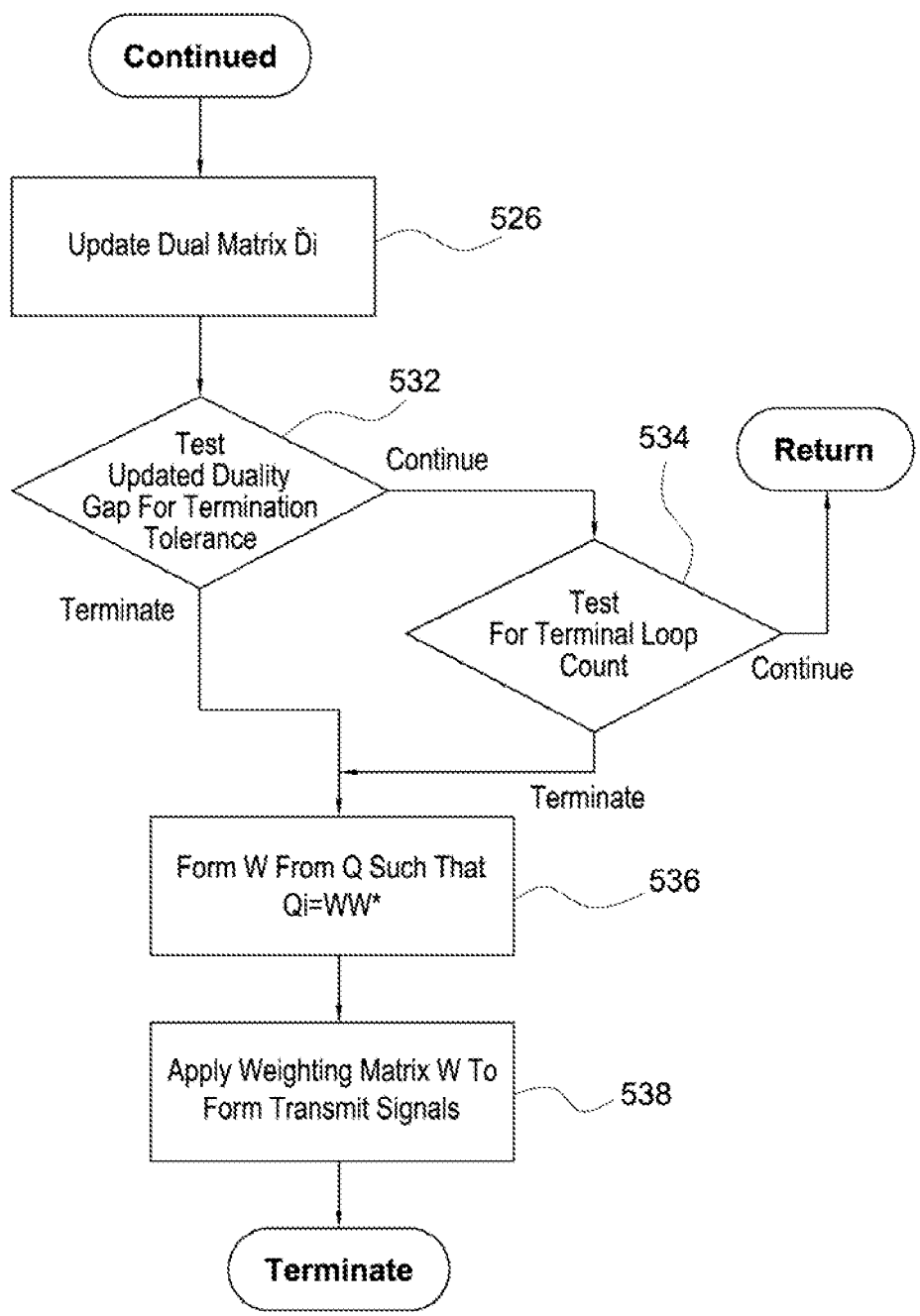
FIG. 5B illustrates, in schematic flow diagram form, another portion of a communication method according to principles of the invention.

FIGS. 5A and 5B visualize, in graphical flowchart form, process steps 500 for producing and applying control parameters for a multipath communication system where the multipath communication system includes a first plurality of transmission antennas and a second plurality of reception antennas, and where the number of transmission antennas is larger than the number of reception antennas. It should again be noted that, while the present example is characterized in terms of radio frequency communications and antennas, as previously noted, the present invention can be applied equally well to a wide variety of other communication systems.

As in the previous example, the control parameters are designated as elements of a complex matrix W, so as to exploit a particular communication channel. Again, the channel is characterized, according to various measurement techniques, by a matrix H of complex numerical values. It will be understood that, in various applications, the characteristics of the communication channel will be dynamic (i.e., time variable) according to the influence of a wide variety of physical inputs including, for example, atmospheric conditions, interference, fading, motions of transmitting and receiving antennas and of other features of the channel environment. It will be appreciated that process 500 can be executed on a periodic and/or occasional basis depending on the degree to which channel characteristics are anticipated to change, or sensed to be changing.

The illustrated process 500 begins 502 with the characterization of a current state of the physical channel. This characterization includes acquiring channel coefficients to form a channel matrix H 504 and calculate subsidiary matrices $\check{H}$ and $\check{G}$ 506 where $$\check{H} = V_i \Sigma_m^{-1} U_H^\dagger$$

and $$\check{G} = \check{H}\check{H}^\dagger$$

One of skill in the art will appreciate that $\check{H}$ represents the pseudo-inverse of the channel matrix H.

Again, it will be understood that channel coefficients are to be represented for operational convenience as complex vectors in a complex vector space. As discussed above, the values of the channel matrix H can be acquired according to a wide variety of known, and to be discovered, methods including, for example, the evaluation of a pilot signal and subsequent receipt by the transmitter of a corresponding feedback signal, and/or the evaluation of reciprocal information based on received general information signals.

The further development of matrix W proceeds by an iterative process. Thus, in further steps, a counter variable i is initialized 508. This counter variable is used to set a maximum number of iterations and, effectively, a maximum calculation time for the preparation of a particular matrix W. A termination tolerance variable $\epsilon$ is also initialized 510. Termination tolerance variable $\epsilon$ stops the iterative process once acceptable intermediate values have been achieved, thereby avoiding unnecessary processing cycles.

An initial matrix $\check{D}_0$ is acquired 512. $\check{D}_0$ will have an arbitrary diagonal value $\check{D}_0 = 0$. Typically, $\check{D}_0$ will be acquired as a value stored in encoded form in a memory device. Where channel characteristics are known in advance, this value may be selected to minimize the processing cycles necessary. Moreover, in certain embodiments, an optimal value of $\check{D}_0$ calculated in one operation of the process 500 will be stored and recovered as an initial value $\check{D}_0$ for a subsequent operation of the process 500.

In contrast to the case of abundant receivers, discussed above, in the present abundant transmitters case, a temporary matrix F is calculated directly from channel matrix H 514, rather than from an intermediate matrix K for as first iteration of the optimization process. I.e., F is calculated as:

$$F_i = H\check{D}_i H^\dagger - I_m$$

and thus embodies the number of antennas, the per antenna power constraint, and channel state. Note well that, in contrast to process 400 described above, the calculation of $F_i$ in process 500 relies on the channel matrix H directly, and on $I_m$ rather than $I_n$.

Thereafter, eigenvalue decomposition of temporary matrix F is performed 516:

$$F_i = U_F \Lambda U_F^\dagger$$

Thereafter discard non-positive eigenvalues of matrix $F_i$ 518—first determining the number of non-positive eigenvalues of $F_i$—and thereafter form matrix $S_i$ where $$S_i = -U_F^k \Lambda_F^k U_F^{k\dagger}$$

and where $\Lambda_F^k$ is the k×k diagonal matrix of all k non-positive eigenmodes of $F_i$ Thereafter form matrix $Z_i$ $$Z_i = \check{H} S_i \check{H}^\dagger$$

and, find matrix $D_i$ by inversion 520

$$D_i = \text{diag}\{(D_{ijj})^{-1}\}, \text{ where } j = 1 \ldots n.$$

Thereafter, form and test matrices B, $\Lambda$ and X to ascertain and exclude any modes (beams) that would otherwise be directed into a null-space of the channel, i.e., such that a beam would be directed to a spatial region in which no effective/efficient receiving antenna is available under the per-transmitter power constraint 522.

$$B_i = V_i^\dagger (Z_i - \check{G}) \check{D}_i V_2 (V_2^\dagger D_i V_2)^{-1}$$

$$\Lambda_i = V_i^\dagger (I_{n-m} - B_i \check{V}_i) D_i V_2) (V_2^\dagger D_i V_2)^{-1}$$

$$X_i = V_2 \Lambda_i V_2^\dagger + V_1 B_i V_2^\dagger - V_2 B_i^\dagger V_1^\dagger$$

Thereafter form transmitted signal covariant matrix $Q_i$ without non-positive eigenvalues and without channel null space 524, $$Q_i = \check{D}_i - \check{G} + Z_i - X_i^\dagger$$

Thereafter, update dual variable $\check{D}_i$ 530

$$\check{D}_{i+1} = \check{D}_i + P - \text{diag}(Q_i)$$

Thereafter, evaluate termination tolerance by calculating the duality value $\Delta$ 532 where $$\Delta = |tr[\check{D}_i(Q_i - P)]|$$

and comparing $\Delta$ to termination tolerance $\epsilon$. If termination tolerance has been exceeded, proceed to formation of W matrix at step 536. Otherwise, increment loop counter i and test for terminal iteration count 534. If terminal iteration count has been exceeded, proceed to formation of W matrix at step 536 otherwise proceed with further iteration.

Upon achieving either termination criterion, form W matrix from $Q_i$ where, for example.

$$Q_i = WW^*$$

$$Q_i = U_Q \Lambda U_{Q^*}$$

$$W = U_Q \Lambda^{1/2}$$

Thereafter, apply elements of matrix W by multiplication with independent input signals 538 as indicated in relation to FIG. 2 above.

Figure 6:
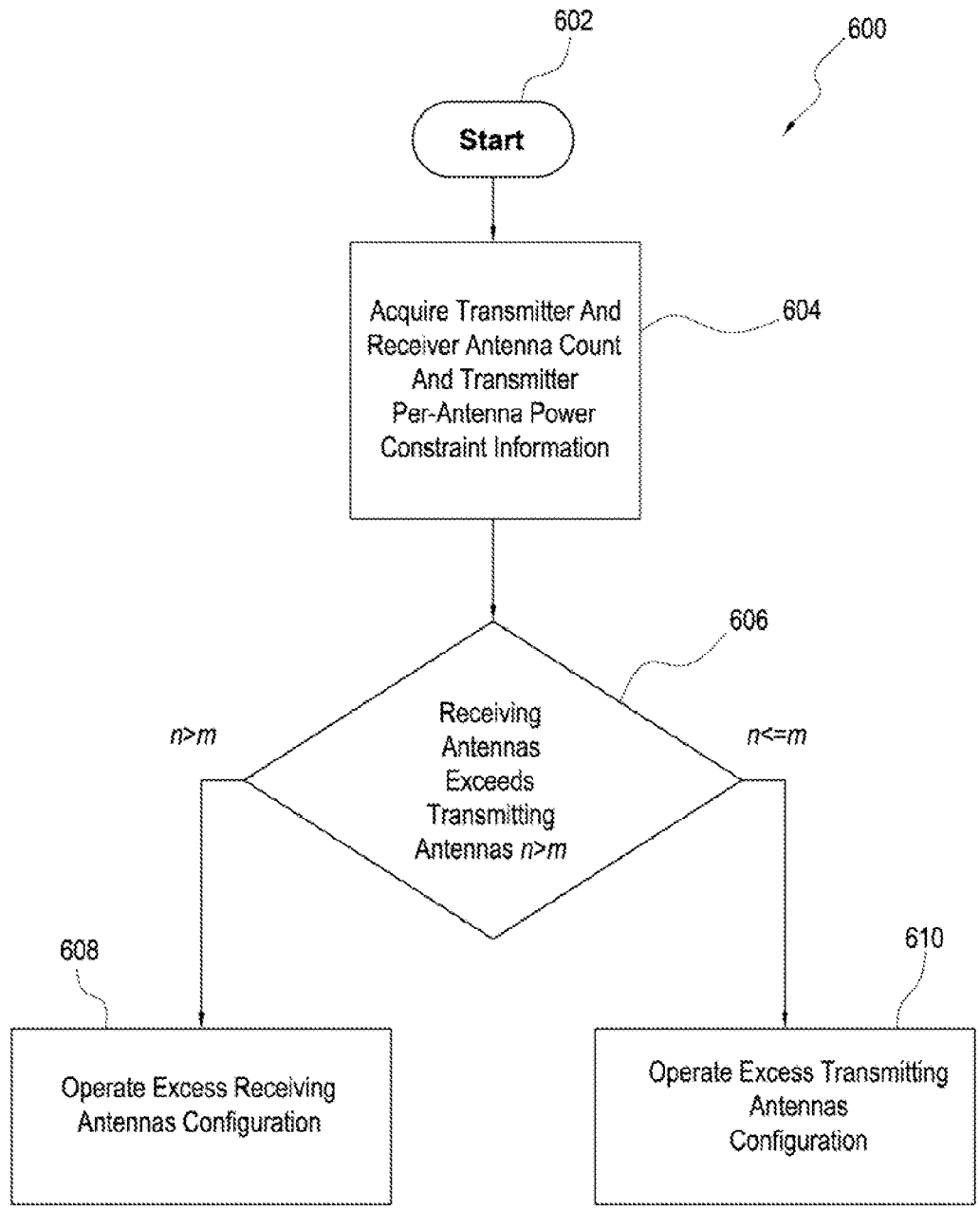
FIG. 6 shows further aspects of a system and method for multipath communication of information according to principles of the invention.

It will be appreciated that one of the advantages of applying a per-antenna power constraint according to the present invention, is the ability to dynamically reconfigure a network, and otherwise respond to a situation in which the number of transmitting and/or receiving antennas is not necessarily known in advance. With this in mind, FIG. 6 shows, in graphical flowchart form, a process 600 for evaluating whether the number of transmitting antennas is more than, or equal to or fewer than, a number of receiving antennas, and responding accordingly. In particular, process 600 described a method for producing and applying control parameters adaptable to a multipath communication system regardless of whether the multipath communication includes more transmission antennas and reception antennas, more reception antennas and transmission antennas, or an equal number of transmission and reception antennas. It will be understood by the reader that this process will be lamented, in various embodiments of the invention, as a system of dedicated hardware components, a configured computer processor system, or any in any other way adapted to achieve the indicated results.

Again, it should again be noted that, while the present example is characterized in terms of communications and antennas, as previously noted, the present invention can also be applied to a wide variety of other communication systems.

Following initiation 602, process 600 includes, acquiring 604 a count of effective transmitter antennas and a receiver antenna, and an acquiring per-antenna power constraint values for each of the transmitter antennas. It will be appreciated that in certain embodiments of the invention, the number of antennas, and there prospective power constraint values, will be changing dynamically as various communication units are added to or dismissed from an ad hoc communications array. Nevertheless, for purposes of the present process, the acquisition of substantially instantaneous values for antenna count and transmitting antenna per-antenna, power constraint will allow effective calculation of desirable weighted signals.

On the basis of these acquired values, a determination is made 606 as to whether the existing configuration represents a system in which there is an excess of receiving antennas 608 or not 610. In the event that an excess of receiving antennas is detected available, process 608 is operated to provide substantially the functionality of process 500 discussed above in relation to FIGS. 5A and 5B. Conversely, if no excess of receiving antennas is detected process 610 is operated to provide substantially the functionality of process 400 discussed above in relation to FIGS. 4A and 4B.

In either event, it will be appreciated by the reader that the indicated steps of process 600 will be repeated frequently or infrequently according to the requirements and design parameters of a particular application. This repetition may be repeated on a chronological basis, on the basis of sensing a new configuration of transmitters, on the basis of pilot signal feedback, or reciprocity, or on any other basis appropriate to a particular application.

Additional detail related to the processes provided below, where the process includes acquiring channel coefficients to populate a channel matrix H where the matrix H has dimensions m×n; where m represents the number of receiving coupling devices (eg, receiving antennas) and where n represents the number of transmitting coupling devices (e.g., receiving antennas).

Having populated the channel matrix H with appropriate channel coefficients, a singular value decomposition is then applied to the matrix $$H = U_H \Sigma_H V_H^\dagger$$

where
$U_H$ is an m×m unitary matrix;
$V_H$ is an m×n unitary matrix;
$V_H$ is an m×n diagonal matrix with diagonal entries as real, non-zero singular values $\sigma_{H,i}$ in decreasing order.

The process includes testing whether the number of receiving antennas n exceeds the number of transmitting antennas m.

If so, then:
form a matrix $V_2$ from the last n−m columns of $V_H$
form a matrix $V_1$ from the first m columns of $V_H$
form <Invert hat.>$\Sigma_m = \text{diag}\{\sigma_H^{-1}, i\}$, m×m diagonal matrix
form $\check{H} = V_1 \Sigma_m U_H$
form $\check{G} = V_1 \Sigma_m^2 V_1^\dagger$ If, however, the number of receiving antennas n does not exceed the number of transmitting antennas m then:
form $\Sigma_n = \text{diag}\{\sigma_{H,i}\}$, n×n diagonal matrix
form $K = V_H \Sigma_n V H^\dagger$
form $\Sigma_n = \text{diag}\{\sigma_{H^{-1},i}\}$, n×n diagonal matrix
form $K = V_H \Sigma_n V H^\dagger$
form $\check{G} = V_H \Sigma_n^2 V_H^\dagger$ Having concluded one of the other of the foregoing alternative procedures, thereafter
form $P = \text{diag}\{P_i\}$, n×n diagonal matrix.
form $D_0 = P + \text{diag}(G)$.

Thereafter, if the number of receiving antennas n does not exceed the number of transmitting antennas m then:

$$(D, Q) = \text{drop-rank-}n(n, D_0, K, K, G, P, \epsilon)$$

otherwise $$(D, Q) = \text{drop-rank-}m(m, D_0, H, H, G, V_1, V_2, P, \epsilon)$$

Whereupon the return process return a matrix Q.

Figure 7:
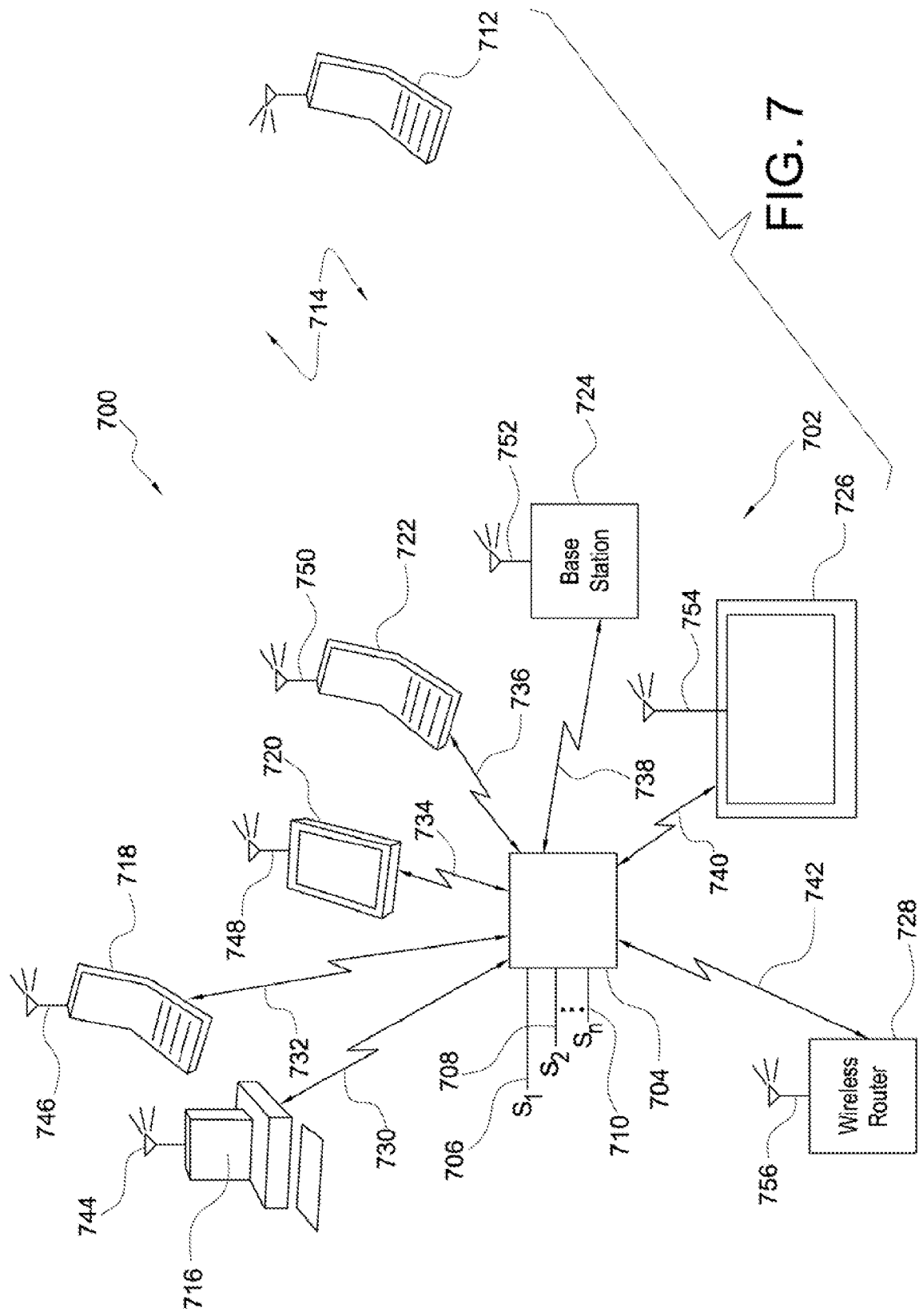
FIG. 7 shows further aspects of a system and method for multipath communication of information, including an ad hoc array according to principles of the invention.

FIG. 7 illustrates, in schematic block diagram form, further aspects of an apparatus, system and method 700 according to principles of the invention. Specifically, FIG. 7 illustrates an exemplary ad hoc antenna array system (here shown as an ad hoc transmitting array system) 702 including transmitter 704 according to principles of the invention. Transmitter 704 is configured to receive one or more exemplary independent signals 706, 708, 710 for transmission to one or more receivers (e.g., 712) through an intervening channel environment 714.

Transmitter 704 is significantly coupled to a plurality of communication units 716, 718, 720, 722, 724, 726, 728 over respective communication links 730, 732, 734, 736, 738, 740, 742. It will be appreciated that the communication links may be of any form and have any characteristic appropriate to the demands of the signals to be exchanged. Thus, the communication links may include any of a wireless communication link, a wired communication link, and optical communication link, infrared communication link, a microwave communication link, and acoustic communication link, and/or any other appropriate communication link employed alone or in combination.

As illustrated, each of the communication units 716, 718, 720, 722, 724, 726, 728 includes a respective antenna 744, 746, 748, 750, 752, 754, 756. One of skill in the art will appreciate, that while the antennas are illustrated as individual antennas, this is merely for purposes of clarity of presentation. In fact, any one or more of the illustrated antennas will, in certain embodiments, the array of antennas, or any other coupling device such as an optical emitter, an acoustical transducer, and electronic amplifier, or any other device appropriate for coupling the respective communication units to the communication channel in use.

Also, it should be noted that, while in certain embodiments, the communication units will be identical to one another, in other embodiments, and as illustrated here, one or more of the communication units will differ from the others. Indeed, in certain embodiments, all of the communication units will differ from one another in their details are in their general configuration.

Thus, for example (and without in any way intending to be limiting or to represent a comprehensive list) the illustrated communication units include a desktop personal computer 716, a cellular telephone 718, a personal digital assistant 720 such as, for example, an IPAD™ or other tablet device, a further cellular or satellite telephone or walkie-talkie device 722, a broadcasting base station 724 of any configuration, a consumer electronics unit 726 such as, for example, a television set having transmission capabilities, or a wireless router 728 or any other network device having an appropriate transmission capability. Again, it is emphasized thin this list of devices is purely exemplary and is in no way comprehensive, but merely represents a range of possible existing and future devices adaptable to the present application.

It will be appreciated that the communication units will communicate with the transmitter 704 over their respective communication links and according to a protocol, such as a standard protocol developed and implemented for the present purposes, to effect an ad hoc array according to principles of the invention. In light of the present illustration, it will be understood that transmitter 704 will receive identification information from a communication unit 716 over communication link 730.

This identification information may include a request to join the ad hoc array, or an offer to join the ad hoc array, and may include a mandatory command to join the ad hoc array. Thereafter, with further reference to FIG. 4 and the corresponding description above, in certain embodiments of the invention, transmitter 704 will receive antenna count information and power constraint information from communication unit 716. Serially or concurrently, transmitter 704 will receive antenna count information and power constraint information from other communication units in the vicinity (i.e. within its communication link range), so as to form an ad hoc array.

Thereafter, consistent with step 404 of process 400, transmitter 704 will acquire channel coefficients to populate a channel matrix H, from communication unit 716, and from other communication units in the ad hoc array. Transmitter 704 will then prepare matrix K by singular value the composition of channel matrix H consistent with step 406 of process 404. In light of the present disclosure, one of skill in the art will readily understand how the balance of process 404 is executed in a particular embodiment of the invention.

In light of the present disclosure, it will also be apparent to one of skill in the art that the processing functions associated with processes 400, 500, 600, etc. may be entirely conducted within hardware or software located in transmitter 704. In other embodiments, however, among any, or all, of the processing requisite to the present invention may be distributed on an ad hoc basis, or under appropriate any distribution regime, among the various communication units.

Moreover, it will be appreciated that the single receiver 712 illustrated in 7 is merely exemplary of a wide variety of arrangements in which equal numbers, more or fewer receivers will be present as compared with transmitters, and one in which both the transmitters and receivers may be individual devices of any type or configuration, or maybe integrated into respective ad hoc arrays.

Figure 8:
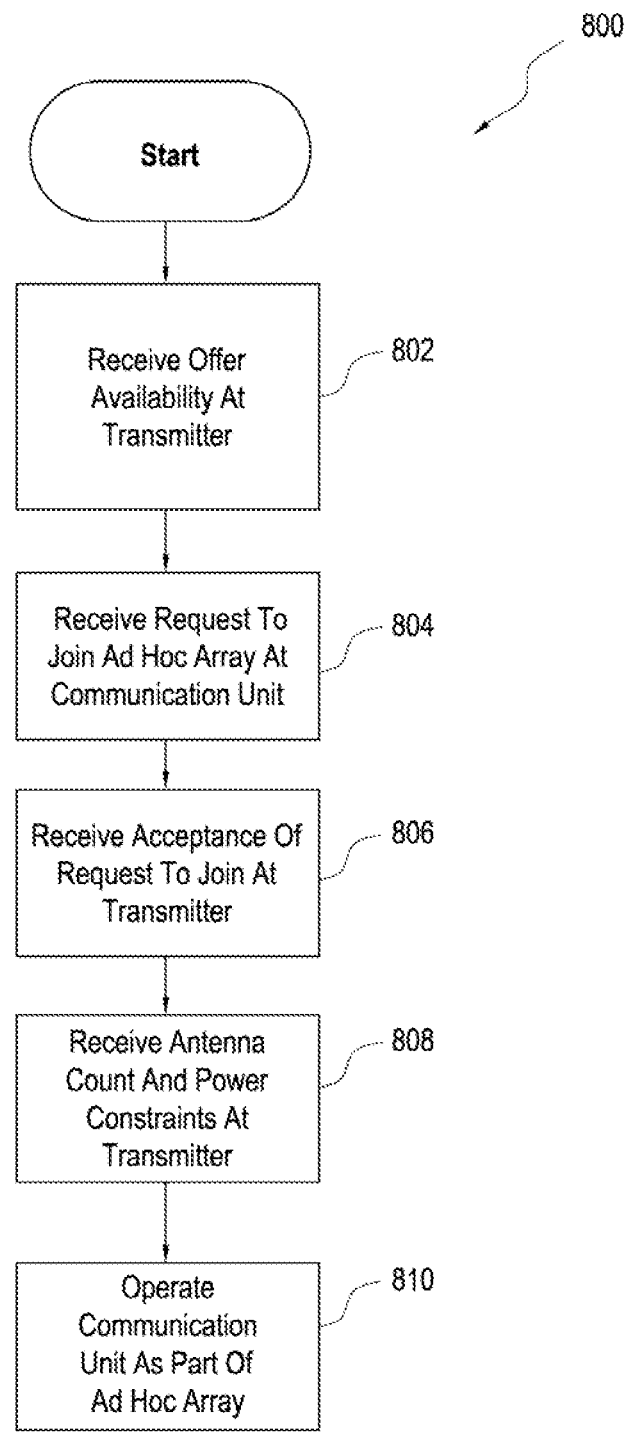
FIG. 8 shows, in flowchart form, further aspects of a system and method for multipath communication of information, including an ad hoc array according to principles of the invention.

In light of the foregoing disclosure, a process as illustrated in flowchart block diagram form in FIG. 8 will include a method for forming an ad hoc communication network 800. In various embodiments, the method will include the steps of receiving an offer of availability 802 from a communications unit at a transmitter; receiving a request to join an ad hoc array at a communication unit from transmitter 804; receiving acceptance of the request to join the ad hoc array to the transmitter from the communication unit 806; receiving antenna count and power constraint information at the transmitter from the communication unit 808; and operating the communication unit as part of the ad hoc array under the control of the transmitter 810.

Figure 9:
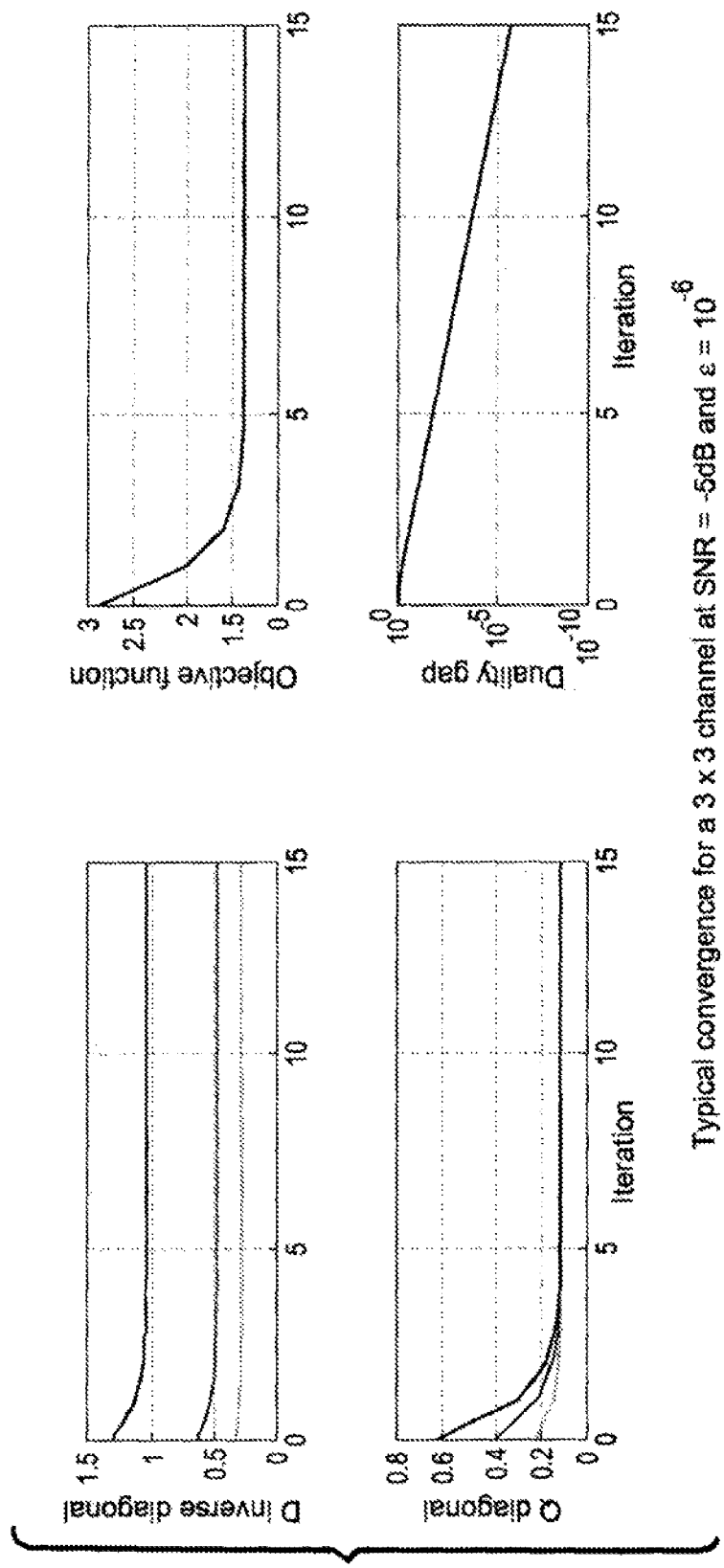
FIGS. 9-13 show, in graphical presentation, simulation results related to experimental simulation of a system and method for multipath communication of information according to principles of the invention.
Figure 10:
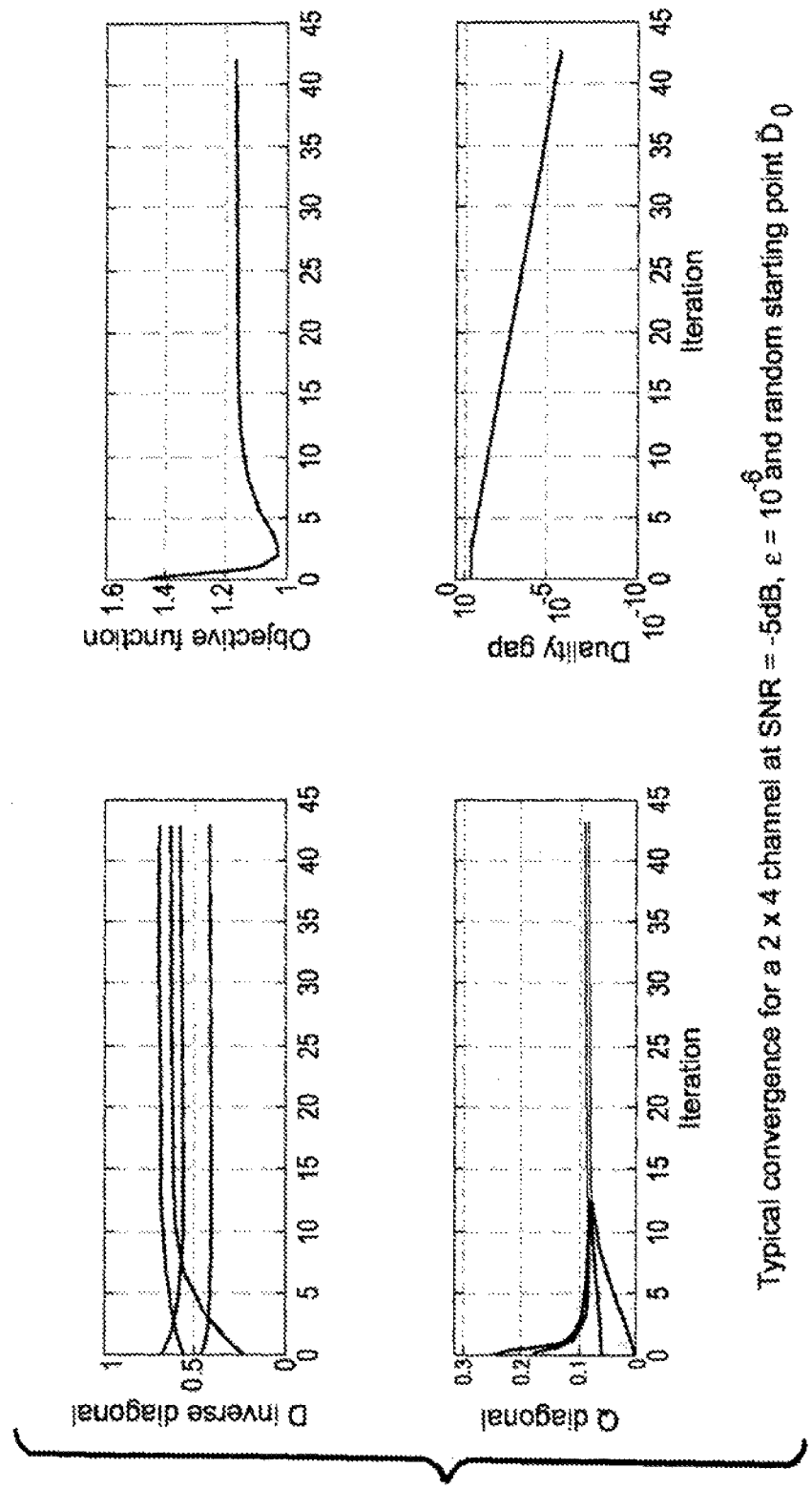
Figure 11:
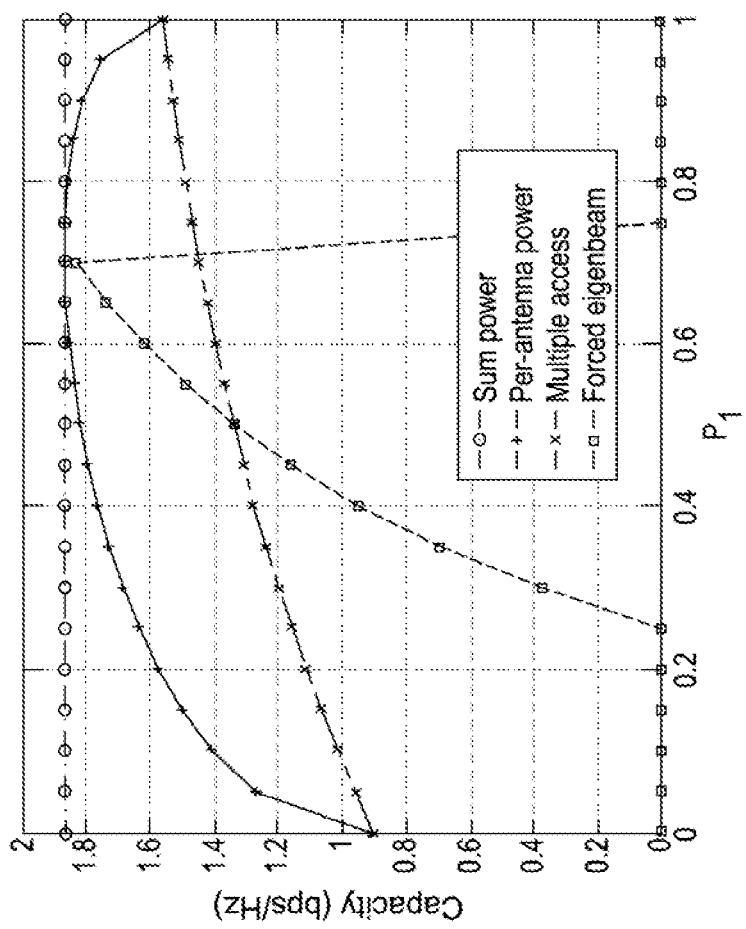
Figure 12:
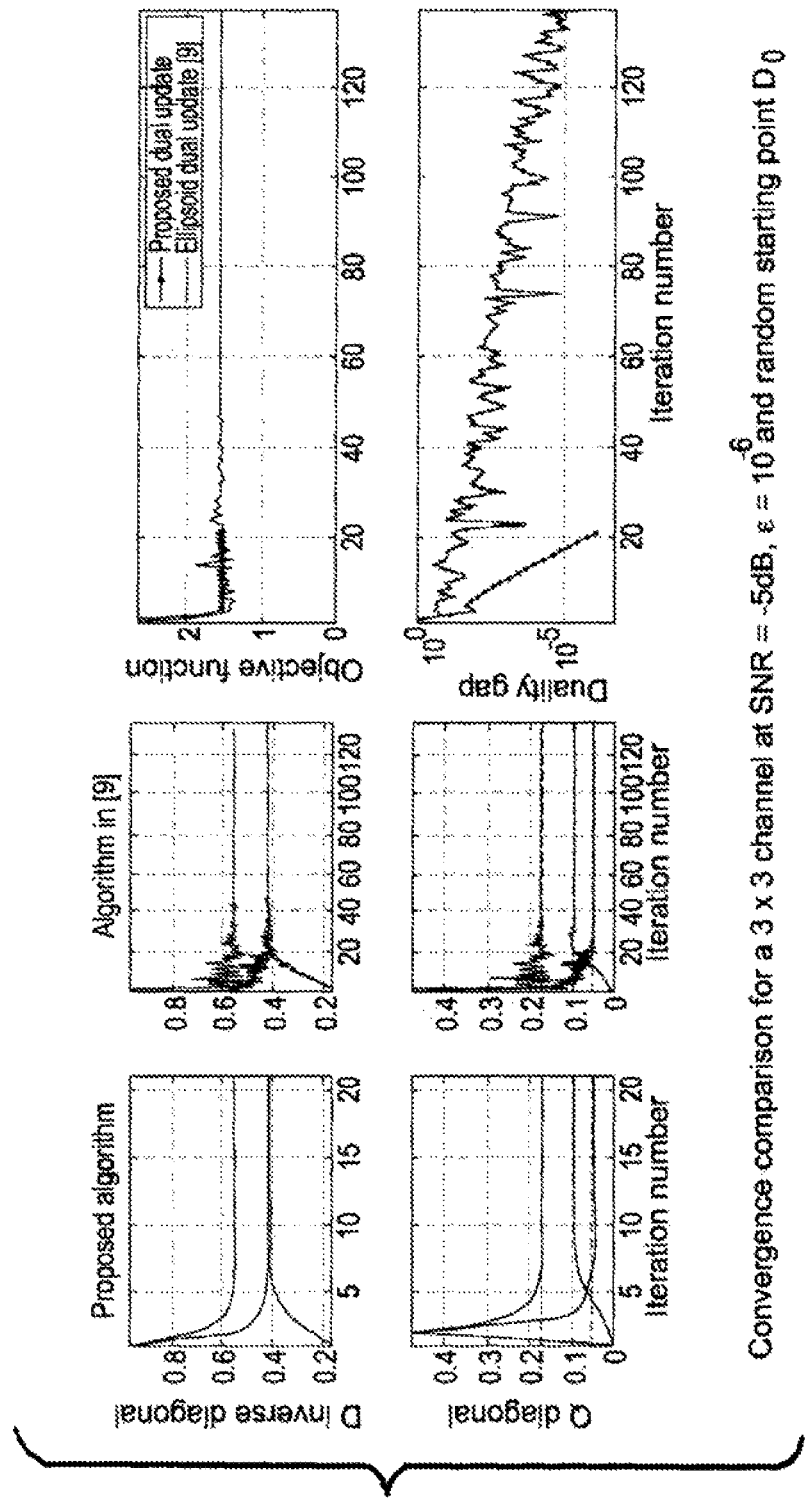
Figure 13:
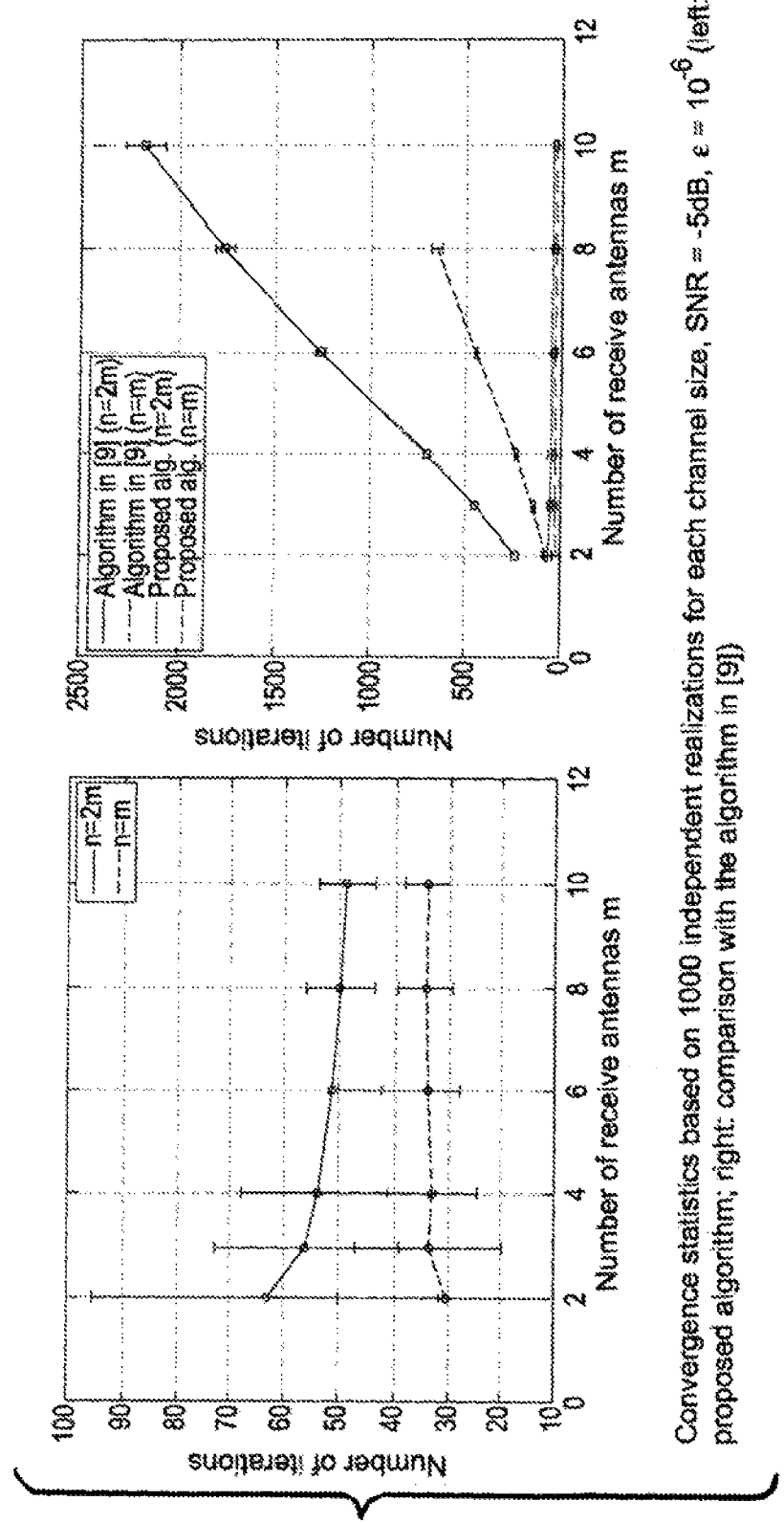
Figure 15:
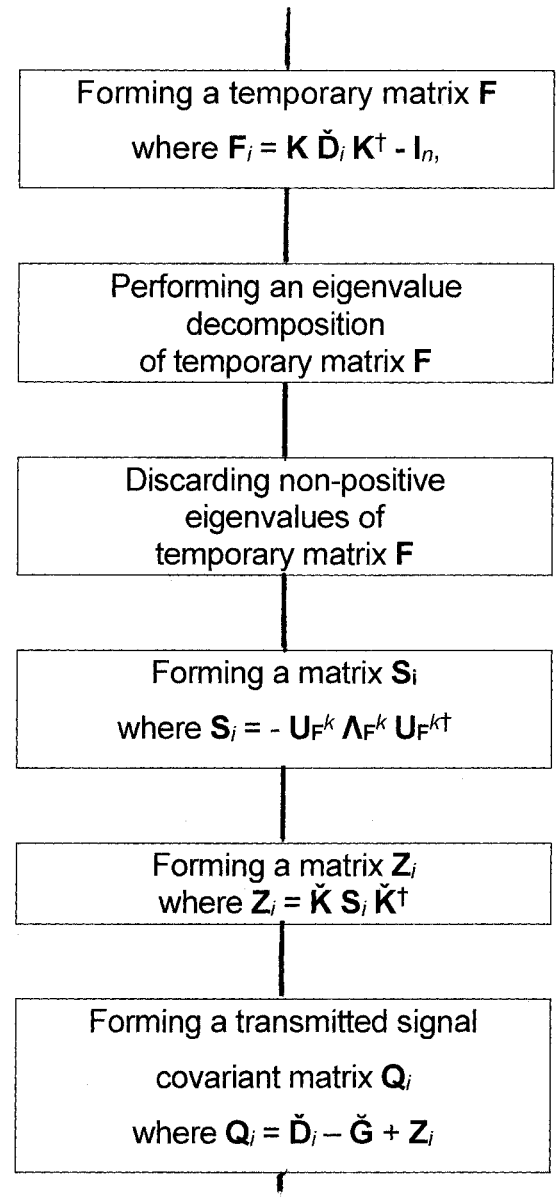
FIG. 15 shows, in flowchart form, iterated steps of a method and process according to principles of the invention.

FIG. 9 shows, in graphical form, a typical convergence for a 3×3 channel at SNR=−5 dB and $\epsilon=10^{-6}$. FIG. 10 shows, in graphical form, a typical convergence for a 2×4 channel at SNR=−5 dB, $\epsilon=10^{-6}$ and random starting point $\check{D}_0$. FIG. 11 shows, in graphical form, capacities of a 2×2 channel with perfect CSIT at SNR=0 dB with P=diag$\{P_1, 1-P_1\}$. FIG. 12 shows, in graphical form, a convergence comparison for it 3×3 channel at SNR=−5 dB, $\epsilon=10^{-6}$ and random starting point $\check{D}_0$ in comparison to a conventional approach. FIG. 13 shows, in graphical form, convergence statistics based on 1000 independent realizations for each channel size, SNR=−5 dB, $\epsilon=10^{-6}$ in comparison to a conventional approach. FIG. 14 shows, in tabular form, a number of non-conversion cases out of 1000) for a conventional approach. Without meaning to be bound to a particular theory of operation, the practitioner of ordinary skill in the art will gain farther appreciation of the details of the present invention from the additional disclosure extracted from the beneficially claimed provisional applications and presented in Appendix A hereof.

While the exemplary embodiments described above have been chosen primarily from the field of wireless communication, one of skill in the art will appreciate that the principles of the invention are equally well applied, and that the benefits of the present invention are equally well realized, in a wide variety of other communications systems including, for example, wired communications and optical communications including, for example, and DSL communications and any other communication protocol presently known or to be developed in the art, microwave channel communications, infrared spectrum communications, extremely low-frequency (ELF) communications, acoustic communications, among others. Further, while the invention has been described in detail in connection with the presently preferred embodiments, it should be readily understood that the invention is not limited to such disclosed embodiments. Rather, the invention can be modified to incorporate any number of variations, alterations, substitutions, or equivalent arrangements not heretofore described, but which are commensurate with the spirit and scope of the invention. Accordingly, the invention is not to be seen as limited by the forgoing description, but is only limited by the scope of the appended claims.

Appendix A

The Capacity of MIMO Channels with Per-Antenna Power Constraint

Mai Vu

Abstract

We establish the optimal input signaling and the capacity of MIMO channels under per-antenna power constraint. While admitting a linear eigenbeam structure, the optimal input is no longer diagonalizable by the channel right singular vectors as with sum power constraint. We formulate the capacity optimization as an SDP problem and solve the KKT conditions to obtain the optimal input covariance as a closed-form function of the dual variable. We then design an efficient algorithm to update this dual variable and establish the optimal input for all channel sizes. The proposed algorithm is found to have fast convergence that is almost independent of the channel size and robust to the starting point. This algorithm thus allows for straightforward implementation in practical systems in real time.

I. INTRODUCTION

The capacity of a MIMO wireless channel depends on transmit power constraints and the availability of channel state information (CSI) at the transmitter and receiver. With sum power constraint across all transmit antennas, the capacity and optimal signaling are well established. For channel state known at both the transmitter and receiver, the capacity can be obtained by performing singular value decomposition of the channel matrix and water-filling power allocation on the channel eigenvalues [1]. For Rayleigh fading channels with state known only at the receiver, the ergodic capacity is obtained by sending independent signals with equal power from all transmit antennas [2].

Under the per-antenna power constraint, the MIMO capacity is less well understood. However, this per-antenna power constraint is more realistic in practice than sum power because each antenna is usually connected to a separate power amplifier on the individual RF chain. Each power amplifier has its own dynamic range, hence the transmitter may not be able to allocate power arbitrarily among its antennas. Another appealing scenario for per-antenna constraint is a distributed MIMO system, which has transmit antennas located at different physical nodes The author was with McGill University, she is now with the Electrical and Computer Engineering department at Tufts University, (email: maivu@ece.tufts.edu). A part of this work has been presented at the IEEE Globecom 2011.

March 31, 2013 that cannot share power with each other. Thus understanding the capacity and optimal signaling schemes under per-antenna power is useful.

The capacity of a *single-user* MIMO channel plays a key role in establishing the capacity of other multi-user channels or designing precoding schemes for them. Take the MIMO multiple access channel with sum power constraint for example, its sum capacity can be solved using the efficient and distributed iterative water-filling algorithm [3], which is based on the solution for single-user MIMO capacity. Similar applications hold for per-antenna power and make important the problem of finding the single-user MIMO capacity under per-antenna power constraint.

A. Previous works with per-antenna power

The per-antenna power constraint has been investigated under different settings. In [4], the problem of a multi-user downlink channel is considered with per-antenna power constraint. For downlink broadcast, the capacity optimization problem is non-convex. It was argued that linear processing at both the transmitter (by multi-mode beamforming) and the receiver (by MMSE receive beamforming with successive interference cancellation) can achieve the capacity region. Using uplink-downlink duality, the boundary points of the capacity region for the downlink channel with per-antenna constraint can be found by solving a convex dual uplink problem, which maximizes a weighted sum rate for the uplink channel with sum power constraint across the users and an uncertain noise. Even though the dual uplink problem is convex, no efficiently customized algorithms, other than standard optimization packages, yet exist for solving it.

Several other works examine the sum rate maximization problem with per-antenna or per-base station power constraint in a MIMO multi-user system [5]–[7]. But because of the non-convex structure of these problems due to interference from other users, it is often hard to solve the optimizations efficiently. Having an algorithm solving the single-user capacity can help build an efficient, iterative algorithm for these multi-user systems.

In a previous paper [8], we have established the capacity of a single-user MISO channel (with single receive antenna) under the per-antenna constraint. The MISO channel admits a closed-form solution for the optimal input signaling as single-mode beamforming with only the beam phases being matched to the channel while the amplitudes are determined by the power constraint.

B. This work and comparison with [9]

In this paper, we solve the single-user MIMO capacity with per-antenna power. With perfect CSI at both transmitter and receiver, in contrary to the case of sum power constraint, channel eigen-beamforming is no longer optimal for per-antenna power. We formulate the capacity optimization problem as a SDP and analyze its KKT optimality conditions. Given that the optimal input is Gaussian, we establish its covariance matrix in closed-form as a function of the dual variables. We then propose a simple, iterative algorithm to update the dual variables to arrive at the optimal input covariance and the capacity. Without CSI at the transmitter (CSIT) in a Rayleigh fading channel, a simple analysis shows that the optimal signaling scheme is to send independent Gaussian signals from all transmit antennas.

The proposed algorithm for the perfect CSI case belongs to a class of *primal-dual interior point methods* where at each iteration, both primal and dual variables are updated, and the primal and dual iterates are not necessarily feasible. In fact the primal solution at each iteration is infeasible since it does not satisfy the per-antenna power constraint, and the algorithm only stops when this primal solution is within a certain tolerance from this constraint. As mentioned in [10], primal-dual interior point methods for non-linear convex problems are still a topic of active research, but show great promise, and for several basic problems, customized primal-dual interior point methods outperform other interior point methods such as the barrier method.

It was brought to our attention at the first review of our manuscript that the MIMO capacity with perfect CSI at both transmitter and receiver is in fact a special case of the problem considered in [9], which we were unaware of. This reference studies block diagonal precoding design to maximize the sum rate for cooperative basestations with per-basestation power constraint. When considered with only one user, the problem reduces to the same single-user MIMO channel considered in this paper. Furthermore, even in the general case, because of the block diagonal condition, the considered sum rate problem decomposes into individual single-user-equivalent rate optimization problems, except that these single-user problems are coupled through the same set of dual variables. Thus at the core, reference [9] solves the same problem as the one considered in this paper, though the two works are independent.

The algorithm in [9] and our proposed algorithm, however, are completely different in both primal solution form and the dual update. In both algorithms, the primal optimization problem is solved in closed form to give the optimal value as a function of the dual variables, then these dual variables are iteratively updated until convergence. In [9], the primal solution relies on Hadamard inequality to perform eigenvalue decomposition and water-filling on the eigenvalues (note the difference to traditional water-filling here is that both eigenvectors and eigenvalues depend on dual variables). Our primal solution is based on directly solving the KKT conditions of the SDP problem in the full matrix form, without decomposing the solution into eigenvectors and eigenvalues. It is interesting to see that the two forms are in fact identical solutions, which is non-obvious. The two primal solution forms also have different computational complexity, where our primal solution requires fewer matrix multiplications when there are no more transmit than receive antennas.

The algorithm in [9] only solves the primal problem then uses the ellipsoid method [11] to update the dual variables. In our algorithm, we also propose a dual update step along with its convergence proof. It turns out that this dual update step critically impacts the convergence path and speed, as well as the robustness of the algorithms. The ellipsoid dual update is slow to converge, has non-smooth convergence path and is highly dependent on the channel size and highly sensitive to the initial point (it is common to find initial points that the algorithm in [9] fails to converge). Our proposed dual update, on the other hand, provides smooth and fast convergence, which is quite surprisingly independent of the channel size and is also robust to any initial point. We provide statistics of the convergence of these two algorithms to support this comparison.

Note also that even though the algorithm that we propose in this paper is for single-user MIMO channels, it can be used as the core of an algorithm for other multi-user channels. For example, we can use it to find the sum capacity of a MIMO-MAC channel with per-antenna power constraint in the same way that iterative water-filling does with sum power constraint in [3]. Also notice that reference [9] discussed above claims to solve a multicell problem, but at the core it is also solving an optimization problem that is single-user equivalent, because of the block diagonalization. The application of the algorithm proposed here therefore goes further than just single-user channels.

C. Organization of this paper

This paper consists of nine sections, with problem setups and preliminaries in Sections II and III. Sections IV–VI discuss the case of perfect CSIT with detailed solutions and algorithms. Section VII discusses the case of Rayleigh fading channel without CSIT. Numerical examples, convergence statistics and comparison with reference [9] are provided in Section VIII before conclusion in Section IX.

For notation, we use bold face lower-case letters for vectors, bold face capital letters for matrices, $(\cdot)^T$ for transpose, $(\cdot)^\dagger$ for conjugate transpose, $\succeq$ and $\preceq$ for matrix inequalities (positive semi-definite relation), tr(.) for trace, diag{.} or diag(.) for forming a diagonal matrix with the specified elements or from the diagonal values of the specified matrix.

II. CHANNEL MODEL AND POWER CONSTRAINTS

A. Channel model

Consider a frequency-flat multiple-input multiple-output (MIMO) channel with $n$ transmit and $m$ receive antennas. The channel between each transmit-receive pair is a complex, multiplicative factor $h_{ij}$. Denote the channel coefficient matrix as $\mathbf{H}$ of size $m \times n$, and the transmit signal vector as $\mathbf{x} = [x_1 \ldots x_n]^T$. Then the received signal vector of length $m$ can be written as $$\mathbf{y} = \mathbf{H}\mathbf{x} + \mathbf{z} \qquad (1)$$

where $z \sim \mathcal{CN}(0, \mathbf{I})$ is a vector of additive white circularly complex Gaussian noise. Here we have normalized the noise power at all receivers, which can be done by absorbing the actual noise power into the transmit power constraint.

Assume perfect CSI at the receiver, we will consider two cases of CSI at the transmitter: perfect CSIT, and no CSIT. Perfect CSIT with $\mathbf{H}$ known also to the transmitter can be applied to slow fading channels, in which channel tracking (by any mean of reciprocity or feedback) is possible, or to non-fading channels such as those in digital subscriber lines. No CSIT is applicable in fast-fading wireless channels, in which the transmitter only knows the channel distribution. For ergodic capacity, we model $\mathbf{H}$ as a random, circular complex Gaussian matrix with zero mean and covariance $\mathbf{I}_{m \times n}$.

The capacity of MIMO channel (1) depends on the power constraint on input signal vector $x$. In all cases, because of the Gaussian noise and known channel state at the receiver, the optimal input signal is Gaussian with zero mean [2]. Let $\mathbf{Q} = E[xx^\dagger]$ be the covariance of this Gaussian input, then the achievable transmission rate for a specific channel is $$r = \log \det \left( \mathbf{I}_m + \mathbf{HQH}^\dagger \right). \tag{2}$$

The remaining question is to establish the optimal $\mathbf{Q}$ that maximizes this rate or its expected value, hence achieves the capacity, according to the CSIT condition and a given power constraint.

*B. Power constraints*

The MIMO capacity is often studied with sum power constraint across all antennas. In this paper, we consider a more realistic per-antenna power constraint. For comparison, we also include independent multiple-access power constraint. We elaborate on each power constraint below.

*1) Sum power constraint:* With sum power constraint, the total transmit power from all $n$ antennas is $P$, but this power can be shared or allocated arbitrarily among the transmit antennas. This constraint translates to a condition on the input covariance as $$\mathrm{tr}(\mathbf{Q}) \leq P. \tag{3}$$

This constraint allows complete cooperation among the transmit antennas.

*2) Independent multiple-access power constraint:* In this case, each transmit antenna has its own power budget and acts independently. This constraint can model the case of distributed transmit antennas, such as on different wireless nodes scattered in a field, without explicit cooperation among them. Let $P_i$ be the power constraint on antenna $i$, then the multiple-access constraint is equivalent to having a diagonal input covariance $\mathbf{Q} = \mathrm{diag}(P_i)$. Denote $\mathbf{P} = \mathrm{diag}(P_i)$, where $\mathrm{tr}(\mathbf{P}) = P$ in relation to (3), then the multiple-access power constraint can also be expressed as $$\mathbf{Q} \preceq \mathbf{P}. \tag{4}$$

Writing this constraint in the above semi-definite form is convenient for analyzing the capacity optimization problem later, but it does not alter the solution since to achieve the capacity, the power constraint must be met with equality and hence $Q = P$.

*3) Per-antenna power constraint:* Here each antenna also has a separate transmit power budget of $P_i$ ($i = 1, \ldots, n$) but can cooperate with each other in terms of signaling. Such a channel can model a physically centralized MIMO system, in which the per-antenna constraint comes from the separate RF chain at each antenna. This channel can also model a distributed (but cooperative) MIMO system, in which each transmit antenna belongs to a sensor or ad hoc node distributed in a network. The distributed nodes have no ability to share or allocate power among themselves. The per-antenna constraint is equivalent to having the input covariance matrix $Q$ with fixed diagonal values $Q_{ii} = P_i$. But different from the multiple-access constraint, the off-diagonal values of $Q$ can be non-zero. Denote $e_i = [0 \ldots 1 \ldots 0]^T$ as a vector with the $i^{th}$ element equal to 1 and the rest are 0. Then per-antenna constraint can also be written as $$e_i^T Q e_i \leq P_i, \quad i = 1 \ldots n. \tag{5}$$

This is a set of linear constraints on $Q$. Again expressing the constraint as an inequality instead of equality does not alter the optimal solution. It should be stressed that constraints on the diagonal values of $Q$ are not the same as constraints on the eigenvalues of $Q$.

III. EIGENBEAM STRUCTURE

The eigen-decomposition of $Q$ is often associated with multimode beamforming. The eigenvectors of $Q$ provide the beam directions, whereas the eigenvalues provide the power allocation on these beams. Next, we will review known results for capacity with sum power, which admit nicely separate solutions for the beam directions and power allocation, in which the beam directions are fixed and are functions only of the channel but not the power constraint. We will then discuss the beam directions for per-antenna power and show that channel singular vectors are no longer applicable.

*A. Review of capacities with sum and multiple access power*

With sum power constraint (3), the optimal solution is found by the well-known water-filling algorithm [1]. Perform the singular value decomposition of the channel as $H = U_H \Lambda_H V_H^\dagger$, which provides well-defined singular vectors for all the non-zero singular values. Then the capacity-optimal covariance matrix $Q^*$ has the eigenvalue decomposition as $Q^* = V_H \Lambda_Q V_H^\dagger$, where the eigenvalues $\lambda_{Q,i}$ are obtained through water-filling as $$\lambda_{Q,i} = (\mu - \lambda_{H,i}^{-2})^+, \quad i = 1 \ldots n \tag{6}$$

for the $\lambda_{H,i} \neq 0$ (if $\lambda_{H,j} = 0$, the corresponding $\lambda_{Q,j} = 0$). Here $\mu$ is the water level chosen such that $tr(Q^*) = P$.

Thus with sum power, the optimal solution for $Q$ is diagonalizable by the channel right singular vectors. The optimal signaling is multi-mode beamforming with the beam directions specified by the channel right singular vectors (associated with the non-zero singular values) and the beam power allocation obtained by water-filling.

With multiple-access constraint (4), the obvious solution is $Q = P$. In this case the optimal signaling is sending independent signals from different antennas, each with the constrained power.

*B. Forced beam directions with per-antenna power*

Because the channel right singular vectors provide a simple yet optimal result for the beam directions with sum power, we may be tempting to use the same beam directions for per-antenna power. But a simple analysis can show that these beam directions may not be feasible, let alone being optimal. That is, we may not always be able to find a $Q$ with eigenvectors given by $V_H$ that satisfies the per-antenna power constraint, if each antenna uses its full power (as often is the case in practice).

Indeed, let $V_H$ be the eigenvectors of $Q$ for per-antenna power, then we can write $Q = \sum_{i=1}^{n} \lambda_{Q,i} v_i v_i^*$, where $v_i$ are columns of $V_H$, and $\lambda_{Q,i}$ are the eigenvalues of $Q$. We now only need to find $\lambda_{Q,i}$ to satisfy the per-antenna power $Q_{j,j} = P_j$. This condition translates to $$\sum_{i=1}^{n} \lambda_{Q,i} |V_{ji}|^2 = P_j, \quad j = 1 \ldots n$$

where $V_{ji}$ denotes the $(j,i)$ entry of $V_H$. Now form a new $n \times n$ matrix $W$ with elements $W_{ji} = |V_{ji}|^2$ and express the eigenvalues of $Q$ in a vector form as $\lambda_Q$, then we obtain $$W \lambda_Q = p, \qquad (7)$$

where $p = [P_1 \ldots P_n]^T$. (Here p is a vector containing the diagonal values of $P$.)

If the power constraint for each antenna is the same, that is $p = \frac{P}{n} 1$, the above equation has a unique solution of $\lambda_Q = \frac{P}{n}$. This implies $Q = \frac{P}{n} I_n$, which is the same as the solution with multiple access constraint. Thus forcing the beam directions to be $V_H$ in this case is the same as sending independent signals from different antennas, i.e., no input optimization.

For any other p, if $W$ is full-rank then the eigenvalues can be found as $\lambda_Q = W^{-1} p$. The problem, however, is that the obtained $\lambda_Q$ may be negative, thus $Q$ may be non-positive semidefinite. In other words, a solution may not exist. Illustration can be found in Figure 3 of the numerical section for a $2 \times 2$ channel, in which for the infeasible cases (equation (7) does not admit non-negative solution), the obtained transmission rate is zero.

However, solutions can exist if we allow the antennas to use less power than the maximum value, such that (7) becomes an inequality. The problem then becomes finding the eigenvalues of $Q$ to maximize the achievable rate $r = \sum_i \log(1 + \sigma_{H,i}^2 \lambda_{Q,i})$ subject to constraint $W\lambda_Q \leq p$. This achievable rate will be understandably less than the capacity, except for special cases. Here we do not solve this problem and defer the discussion to the numerical examples section.

IV. CAPACITY OPTIMIZATION WITH PERFECT CSIT

In this section, we analyze the optimization problem of finding MIMO capacity with channel known at both the transmitter and receiver. For all stated power constraints, this capacity optimization can be cast as follows.

$$\max \quad \log\det\left(I_n + HQH^\dagger\right) \tag{8}$$
$$\text{s.t.} \quad g(Q,P) \leq 0$$
$$Q \succeq 0,$$

where $g(Q,P) \leq 0$ refers to a power constraint as in (3), (4) or (5), and $Q$ is Hermitian.

Since all considered power constraints are linear in $Q$, the above optimization is convex with any power constraint. By Slater's condition [10], because of the strictly feasible value $Q = P \succ 0$ which readily satisfies all power constraints, the optimal solution always exists. Thus for each power constraint, the problem admits a unique optimal solution for $Q$. Here we focus on the problem with per-antenna constraint (5).

While the convex structure of this problem allows the optimal solution to be found numerically using available convex optimization software, such a numerical solution may be too complex for real-time system implementation and offers little analytical insights. Next, we will analyze this problem and the optimality conditions to find the optimal solution analytically. In these analyses, we assume that the channel $H$ is full-rank. (If $H$ is rank-deficient, no power should be put in the channel null space, hence we can drop the zero eigenmodes of the channel, reformulate the capacity equation with only the full-rank portion of $H$ and apply the analysis.)

A. Capacity optimization using SDP framework

Problem (8) can be analyzed using the SDP framework. Let $D = \text{diag}(d_i) \succeq 0$ be a diagonal matrix consisting of Lagrangian multipliers $d_i$ for the per-antenna power constraints in (5), and $M \succeq 0$ be the Lagrangian multiplier for the positive semi-definite constraint. Both $D$ and $M$ have size $n \times n$. Then the Lagrangian for problem (8) with per-antenna power can be formed as $$\mathcal{L}(Q, D, M) = \log\det\left(I_n + HQH^\dagger\right) - \text{tr}[D(Q - P)] + \text{tr}(MQ). \tag{9}$$

Note that we can form similar Lagrangian for the problem with sum power or multiple access constraint by replacing $D$ with $\mu I_n$ (scaled identity) or $B$ (full matrix), respectively. These facts will be useful later when we compare solutions of different power constraints in Section VI-D. Now we will focus on per-antenna power. Note also that for per-antenna power, this dual variable $D$ is equivalent to the uncertain noise introduced in [3].

Taking the first order derivative of $\mathcal{L}$ in (9) with respect to $Q$ (see [12] Appendix A.7 for derivatives of a function with respect to a matrix) and equating to zero, we obtain $$H^\dagger (I_m + HQH^\dagger)^{-1} H - D + M = 0.$$

Based on the KKT conditions, we then obtain a set of optimality conditions as follows.

$$H^\dagger (I_m + HQH^\dagger)^{-1} H = D - M \qquad (10)$$

$$MQ = 0$$

$$\text{diagonal } D \succ 0$$

$$\text{Hermitian } M, Q \succeq 0.$$

Since the problem is convex, the optimal $Q$ is the solution to the above set of equations. Next, we will analyze this set of equations to first deduce a condition on the rank of optimal $Q$, then provide an equation for solving for $Q$.

B. Rank of the optimal input covariance

Following arguments similar to [8] (Appendix B), multiplying both sides of the first equation in (10) on the right with $Q$ and applying the complementary slackness condition $MQ = 0$, we obtain $$DQ = H^\dagger (I_m + HQH^\dagger)^{-1} HQ. \qquad (11)$$

At optimum, we must have $D \succ 0$. This is because each constraints in (5) must be met with equality, for otherwise we can always increase a diagonal value of $Q$ and get a higher rate; hence the associated dual variables are strictly positive. Thus at optimum, $D$ is full-rank, subsequently (11) implies that $$\text{rank}(Q) \leq \text{rank}(H).$$

Therefore, the rank of the optimal input covariance is no more than the channel rank. In other words, the number of independent signal streams (or modes) should be no more than the rank of the channel. This result is similar to that with sum power constraint.

Since channel $H$ can support at most $r = \min(m, n)$ independent modes (independent signal streams), the above condition implies that the rank of $Q$ is at most $r$. When the rank of $Q$ is less than $r$, that implies mode-dropping (similar to the same concept with sum power constraint). Since $QM = 0$, $M$ is a positive semidefinite matrix in the null space of $Q$. The rank of $M$ corresponds to the number of modes that has to be dropped for $Q$ to be positive semidefinite. Suppose that the optimal solution has $k$ modes dropped ($0 \leq k < \min\{m,n\}$), then $$\text{rank}(M) = k, \quad \text{rank}(Q) = \min\{m,n\} - k. \tag{12}$$

The difference between the rank of $Q$ and the size of $Q$ should be stressed here. The size of $Q$ is $n \times n$. If $n > m$ (more transmit than receive antennas), the optimal $Q$ is inherently rank-deficient. In this case, even without any mode-dropping, the maximum rank of $Q$ is $m < n$. Thus no mode-dropping does not always imply full-rank $Q$. Only if $n \leq m$ then $Q$ can be full-rank without mode-dropping.

C. Optimality conditions with per-antenna power

From the set of optimality conditions (10), we can obtain the following lemma.

Lemma 1. *As $D$ is full-rank and invertible, denote $\tilde{D} = D^{-1}$ and define*

$$R_m = HQH^\dagger$$
$$F_m = H\tilde{D}H^\dagger, \tag{13}$$

*then the optimality conditions (10) imply*

$$(R_m - F_m + I_m)R_m = 0. \tag{14}$$

The proof is given in Appendix A. Note that both $R_m$ and $F_m$ are $m \times m$ Hermitian matrices and the achievable rate for each channel state in (2) can now be expressed as $r = \log\det(I_m + R_m)$, which is a sole function of $R_m$.

Condition (14) provides the equation for solving for $Q$. To understand the meaning of this equation better, lets denote $$S_m = R_m - F_m + I_m. \tag{15}$$

Then condition (14) becomes $S_m R_m = 0$. Now from (12) and (13), as no positive eigenmodes of $Q$ should be in the nullspace of $H$, we have $\text{rank}(R_m) = \text{rank}(Q) = \min\{m,n\} - k$. We can also show that $H\tilde{D}M = S_m H$ (see Appendix A for the proof). Since $\tilde{D}$ is square and full rank, this equation implies that the part of $S_m$ outside the null space of $H$ has the rank of at most $k$ (which is the rank of $M$).

Thus $S_m$ is a matrix in the null space of $R_m$, in the same way that $M$ is in the null space of $Q$ (but not necessarily spanning all the null space). In other words, $R_m$ contains the active transmission modes, and $S_{oo}$ contains the modes that are dropped. Equation (14) essentially transforms the slackness condition from $(M, Q)$ space to $(S_{oo}, R_{oo})$ space.

Next, we will use (14) to solve for the optimal Q.

V. OPTIMAL INPUT COVARIANCE WITH PER-ANTENNA POWER

In this section, we establish the optimal value of Q as an explicit function of the dual variable D, using Lemma 1. For the preliminary, let the singular value decomposition of the channel matrix be $$H = U_H \Sigma_H V_H^\dagger \quad (16)$$

where

- $U_H$ is a $m \times m$ unitary matrix containing the left singular vectors,
- $V_H$ is a $n \times n$ unitary matrix containing the *right singular vectors* and
- $\Sigma_H$ is a $m \times n$ diagonal matrix containing the (real) singular values in decreasing order.

Note that the input covariance matrix is always of the size of columns of the channel matrix (i.e. the number of transmit antennas $n$), but the channel can be either column or row rank-limited. It is thus necessary to distinguish two cases of channel sizes: $n \leq m$ and $n > m$.

A. Case $n \leq m$ (fewer transmit than receive antennas)

For $n \leq m$, the optimal Q solution can have up to all $n$ modes. In Lemma 1, however, $F_{oo}$ is not full-rank. To proceed, we need to convert this matrix to full-rank as follows.

In (16), for $n \leq m$, we can write $\Sigma_H = [\Sigma_s, 0_{s \times (m-n)}]^T$, where $\Sigma_s$ is a $n \times n$ diagonal matrix containing the real (non-zero) singular values of H. Now define $$K = V_H \Sigma_s V_H^\dagger. \quad (17)$$

then K is square and full-rank. From Lemma 1, we can derive the following result.

Lemma 2. *Define two $n \times n$ matrices as*

$$R_o = KQK^\dagger$$
$$F_o = KDK^\dagger. \quad (18)$$

*then for $n \leq m$, the optimality conditions (10) imply*

$$(R_o - F_o + L_o)R_o = 0. \quad (19)$$

We get an equation similar to (14), but here for $n \leq m$, $F_o$ is full-rank.

*Proof:* Multiplying (14) on the left with $\mathbf{H}^\dagger$ and on the right with $\mathbf{H}$, and noting that $\mathbf{H}^\dagger\mathbf{H} = \mathbf{K}\mathbf{K}^\dagger$, we obtain $$\mathbf{K}[(\mathbf{R}_a - \mathbf{F}_a + \mathbf{I}_n)\mathbf{R}_a]\mathbf{K}^\dagger = 0.$$

Since for $n \leq m$, $\mathbf{K}$ is square, full-rank and hence is invertible, the above equation is equivalent to (19). ∎

We now analyze equation (19). This equation can be written as $\mathbf{R}_a^2 + \mathbf{R}_a = \mathbf{F}_a\mathbf{R}_a$. This equality implies that $\mathbf{F}_a\mathbf{R}_a$ is Hermitian and has the same eigenvalue decomposition as $\mathbf{R}_a^2 + \mathbf{R}_a$, which has the same eigenvectors as those of $\mathbf{R}_a$. This is possible only if $\mathbf{R}_a$ and $\mathbf{F}_a$ share the same eigenvectors for the non-zero eigenvalues. Now since for $n \leq m$, $\mathbf{F}_a$ is full rank and Hermitian, it has a unique eigenvalue decomposition (up to any multiplicity of eigenvalues). From (18), $\text{rank}(\mathbf{R}_a) = \text{rank}(\mathbf{Q}) = n - k$. Equation (19) then implies that $\mathbf{R}_a$ must span $n - k$ eigenspaces of $\mathbf{F}_a$; specifically, the $n - k$ eigenvectors corresponding to the non-zero eigenvalues of $\mathbf{R}_a$ are the same as $n - k$ eigenvectors of $\mathbf{F}_a$. Define $$\mathbf{S}_a = \mathbf{R}_a - \mathbf{F}_a + \mathbf{I}_n \qquad (20)$$

then equivalently, (19) implies that $\mathbf{S}_a$ spans the *other* $k$ eigenspaces of $\mathbf{F}_a$: the $k$ eigenvectors with non-zero eigenvalues of $\mathbf{S}_a$ are the same as the other $k$ eigenvectors of $\mathbf{F}_a$.

Intuitively, this result can be interpreted as follows. Note that we can write $\mathbf{F}_a - \mathbf{I}_n = \mathbf{R}_a - \mathbf{S}_a$. The matrix $\mathbf{F}_a - \mathbf{I}_n$ may contain some positive and some non-positive eigenvalues. Then $\mathbf{R}_a$ is the portion that contains only the positive eigenmodes, and $(-\mathbf{S}_a)$ is the portion that contains only the non-positive eigenmodes. As such, both $\mathbf{R}_a$ and $\mathbf{S}_a$ are positive semidefinite matrices and are orthogonal to each other. Indeed, if $\mathbf{S}_a$ contains negative eigenmodes, we can always move these eigenmodes to $\mathbf{R}_a$ and obtain a higher rate, hence the optimal $\mathbf{S}_a$ is positive semidefinite. In other words, $\mathbf{R}_a$ contains the (positive) $n - k$ transmission modes, while $\mathbf{S}_a$ contains the $k$ modes that are dropped.

Based on this analysis, we can obtain the optimal value for $\mathbf{Q}$ as a function of $\mathbf{D}$ as follows.

Theorem 1. *For $n \leq m$, $\mathbf{K}$ as defined in (17) is full-rank and invertible. Denote $\check{\mathbf{K}} = \mathbf{K}^{-1}$, then for a given $\mathbf{D} \succ 0$, the optimal $\mathbf{Q}$ satisfying the optimality conditions (10) is given by*

$$\mathbf{Q}^* = \mathbf{D} - \check{\mathbf{K}}\check{\mathbf{K}}^\dagger + \mathbf{Z}, \qquad (21)$$

*where $\mathbf{Z} = \check{\mathbf{K}}\mathbf{S}_a\check{\mathbf{K}}^\dagger$, and $(-\mathbf{S}_a)$ is obtained as the non-positive eigenmodes of $\mathbf{K}\mathbf{D}\mathbf{K}^\dagger - \mathbf{I}_n$.*

*Proof:* From (18), we have $\mathbf{Q} = \check{\mathbf{K}}\mathbf{R}_a\check{\mathbf{K}}^\dagger$. Result (21) then follows directly from (19), (20) and the associated analysis. ∎

Theorem 1 gives the solution for $\mathbf{Q}$ in terms of the dual variable $\mathbf{D}$. Here $\mathbf{K}$ is a function of the channel as defined in (17), while $\mathbf{S}_a$ is determined from $\mathbf{F}_a$ which is a function of $\mathbf{D}$ as in (18). Note that since $R_{qq}$ contains only the positive eigenmodes of $F_{qq} - I_{nn}$, the optimal $Q^*$ as formed in (21) is always positive semidefinite. Thus the only step left is to find the optimal dual variable $D$ such that $Q^*$ satisfies the power constraint of $\text{diag}(Q^*) = P$.

To find the optimal $D$, at this point, we need to use an iterative algorithm which we will discuss in Section VI.

B. Case $n > m$ (more transmit than receive antennas)

For $n > m$, the optimal $Q$ is inherently rank-deficient since the channel can support at most $m$ modes, which is smaller than the number of transmit antennas. For this case, we need to further decompose channel $H$ as follows.

In (16), for $n > m$, we can write $\Sigma_H = [\Sigma_{mm}\ 0_{m,n-m}]$, where $\Sigma_{mm}$ is a $m \times m$ diagonal matrix containing the singular values of $H$. Now separate the right singular vectors of $H$ as $$V_H = [V_1\ V_2], \quad \begin{array}{l} V_1 = \text{first } m \text{ columns} \\ V_2 = \text{last } n - m \text{ columns}. \end{array} \qquad (22)$$

Here $V_1$ contains the basis for the row space of $H$, while $V_2$ contains the basis for the null space of $H$. Only $V_1$ is unique, but $V_2$ can be any basis matrix spanning the null space of $H$ (i.e. of $V_1$). Note that we can also write $H = U_H \Sigma_{mm} V_1^\dagger$. Now lets denote the channel "inverse" $\tilde{H}$ as $$\tilde{H} = V_1 \Sigma_{mm}^{-1} U_H^\dagger. \qquad (23)$$

then $H\tilde{H} = I_{mm}$. The use of $\tilde{H}$ will become apparent later.

Next, from (10), multiplying both sides of the first equation on the left with $V_2^\dagger$ and on the right with $Q$, then applying the second equation, we get $$V_2^\dagger D Q = 0. \qquad (24)$$

Equation (24) places a constraint on the rank of $Q$ as a direct consequence of $m < n$.

In this case, $F_{qq}$ as defined in (13) is full rank and Hermitian, hence it has unique eigenvalue decomposition (up to any multiplicity of eigenvalues). Equation (14) of Lemma 1 then implies $R_{qq}$ and $S_{qq}$ share eigenvectors with $F_{qq}$, where $R_{qq}$ spans $m-k$ eigenspaces of $F_{qq}$ and $S_{qq}$ spans the other $k$ eigenspaces of $F_{qq}$. Specifically, $R_{qq}$ contains the positive eigenmodes of $F_{qq} - I_{nn}$ while $(-S_{qq})$ contains the non-positive eigenmodes. (The negation is just for convenience so that $S_{qq}$ is positive semidefinite.)

Now from (13) and (15), we obtain $$H(Q - D)H^\dagger = S_{qq} - I_{mm}. \qquad (25)$$

Different from (19) of Lemma 2, the above equation is under-determined for Q. In order to find the unique optimal $Q^*$, we need to combine (25) with the rank condition (24). Based on these two equations, we can obtain the optimal $Q^*$ as follows.

Theorem 2. *For $n > m$, establish $V_1$, $V_2$ as in (22) and $\tilde{H}$ as in (23). Then for a given $D \succ 0$, the optimal Q satisfying the optimality conditions (10) is given by*

$$Q^* = D - \tilde{H}\tilde{H}^\dagger + Z - X, \tag{26}$$

*where $Z = \tilde{H}S_{nn}\tilde{H}^\dagger$, and $(-S_{nn})$ is obtained as the non-negative eigenmodes of $\tilde{H}D\tilde{H}^\dagger - L_{nn}$. Here X is a Hermitian matrix given as*

$$X = V_2 A V_2^\dagger + V_1 B V_2^\dagger + V_2 B^\dagger V_1^\dagger, \tag{27}$$

*where A is a $(n-m) \times (n-m)$ Hermitian matrix and B is a $m \times (n-m)$ matrix given by*

$$B = V_1^\dagger (Z - \tilde{H}\tilde{H}^\dagger) D V_2 \left(V_2^\dagger D V_2\right)^{-1},$$

$$A = \left(L_{nn} - B^\dagger V_1^\dagger D V_2\right) \left(V_2^\dagger D V_2\right)^{-1}. \tag{28}$$

The proof is in Appendix B.

Equations (26)-(28) of Theorem 2 give the solution for Q in terms of the dual variable D in a form similar to (21) of Theorem 1. However, there are extra terms here involving $V_2$ which spans the null space of the channel. In (26) and (28), Z is a function of $S_{nn}$, which is determined from $F_{nn}$, which in turn is a function of D. Thus again the only remaining step is to find a diagonal $D \succ 0$ such that $\text{diag}(Q^*) = P$.

*C. The duality gap*

To better understand the results of Theorems 1 and 2, we now analyze the duality gap. The solutions of $Q^*$ in (21) and (26) always satisfy $MQ = 0$ and $Q \succeq 0$ as depicted in the set of optimality conditions (10). For a given dual variable D, such a $Q^*$ is precisely the optimal primal variable to establish the Lagrange dual function from the Lagrangian (9) as $$\mathcal{L}^*(D) = \max_{Q,M} \mathcal{L}(Q, D, M)$$

$$= \log \det \left(I_n + HQ^*H^\dagger\right) - \text{tr}[D(Q^* - P)].$$

The optimal dual variable $D^*$ is then the value that minimizes the above dual function. Solving for $D^*$ by directly minimizing $\mathcal{L}^*(D)$, however, is not simple because the derivative of $Q^*$ with respect to D is complicated and may not even be derivable in closed-form. However, since problem (8) is convex and satisfies Slater's condition, it has zero duality gap at optimum. For a given $\hat{D}$, the duality gap is $$G(\hat{D}) = -\text{tr}[\hat{D}(Q^* - P)]. \quad (29)$$

Any algorithm that has this duality gap approach zero will converge to the optimal value.

VI. ALGORITHMS FOR FINDING THE OPTIMAL Q

In this section, we investigate the remaining question of finding a diagonal matrix $\hat{D} \succ 0$ such that the solutions in Theorems 1 and 2 satisfy $\text{diag}(Q^*) = P$. There appears to be no closed-form analytical solution for such a $\hat{D}$. Fortunately, equations (21) and (26) in these theorems suggest a way to compute D iteratively. In the follows, we design an iterative algorithm for finding the optimal $\hat{D}$, and hence optimal $Q^*$, for each case of $n \leq m$ and $n > m$. Then we integrate both cases in a main program for any channel size.

A. Iterative algorithm for finding $Q^*$ when $n \leq m$

Equation (21) in Theorem 1 suggests a simple iterative algorithm for finding the optimal $\hat{D}$.

First we need to choose an initial point $\hat{D}_0$. This point can be chosen arbitrarily as long as it satisfies $\hat{D}_0 \succ 0$. For potentially faster convergence, we follow the mode-dropping approach similar to water filling. For the initial point, we assume that there is no mode-dropping. Denote $G = KK^\dagger$, then based on (21), we can just simply choose diagonal matrix $\hat{D}_0$ as $$\hat{D}_0 = P + \text{diag}(G). \quad (30)$$

This solution always satisfies $\hat{D} \succ 0$ since G as a positive semidefinite matrix has non-negative diagonal values. At this step, we can perform a quick check to see if $\hat{D}_0 - G$ is positive semidefinite. If it is, then this value is the optimal input covariance, i.e. $Q^* = \hat{D}_0 - G$, and no iteration is needed.

If $(\hat{D}_0 - G)$ is non-positive semidefinite, then we adjust $\hat{D}$ using an iterative procedure as follows. Say at iteration $i$ ($i \geq 0$), we have obtained $\hat{D}_i$. Then we can form $F_{n,i}$, $S_{n,i}$ and $Q_i$ as $$F_{n,i} = K\hat{D}_i K^\dagger$$
$$-S_{n,i} = \text{non-positive eigenmodes of } (F_{n,i} - I_n)$$
$$Z_i = KS_{n,i}K^\dagger$$
$$Q_i = \hat{D}_i - G + Z_i. \quad (31)$$

The $Q_i$ as computed in (31) is always positive semidefinite (as a consequence of Theorem 1). The term $Z_i \succeq 0$ can be thought of as the adjustment at step $i$ to make $Q_i \succeq 0$. But it does not

Algorithm 1 drop-rank-n$(n, D_0, \tilde{K}, K, G, P, \epsilon)$: Iterative search for $Q^*$ when $n \leq m$.
Require: $D_0$ diagonal $\succ 0$, $P$ diagonal $\succ 0$, $\epsilon > 0$. Also $\tilde{K} = K^{-1}$ and $G = KK^t$.
1: Initialize $i = 0$. (iteration count)
2: Initialize $\Delta = 1 + \epsilon$. (loop terminating variable)
3: while $(\Delta > \epsilon)$ do
4:     Form $F_i = KD_iK^t - I_n$. (note that $-I_n$ is included here)
5:     Perform the eigenvalue decomposition $F_i = U_F \Lambda_F U_F^t$. Let $k$ be the number of non-positive eigenvalues of $F_i$.
6:     Form $S_i = -U_F^k \Lambda_F^k U_F^{k\,t}$ where
       $\Lambda_F^k$ is the $k \times k$ diagonal matrix of all $k$ non-positive eigenvalues of $F_i$.
       $U_F^k$ consists of the corresponding $k$ eigenvectors.
7:     Form $Z_i = \tilde{K} S_i \tilde{K}^t$.
8:     Form $Q_i = D_i - G + Z_i$.
9:     Form $D_{i+1} = D_i + P - \text{diag}(Q_i)$.
10:    Compute $\Delta = |\text{tr}(D_i(Q_i - P))|$.
11:    $i \leftarrow i + 1$.
12: end while
13: return $D_i$ and $Q_i$.

guarantee that the diagonal of $Q_i$ will be $P$. From (31), noting that $D_i$ is diagonal, we update $D_{i+1}$ by the difference between the diagonal of $Q_i$ and $P$ as $$D_{i+1} = D_i + P - \text{diag}(Q_i). \tag{32}$$

This dual update is valid as it always produces positive definite $D_{i+1}$. This is because from (32) and (31), we can write $$D_{i+1} = P + \text{diag}(G - Z_i). \tag{33}$$

Noting that $G - Z_i = \tilde{K}(I - S_{n,i})\tilde{K}^t$, and we have $I - S_{n,i}$ as eigenmodes of $F_{n,i}$ and hence positive semidefinite. Thus (33) implies $D_{i+1} \succ P$ for all updates ($i \geq 0$), irrespective of the initial point $D_0$.

Iteration stops when the diagonal values of $Q_i$ is close to $P$ within an acceptable tolerance. In implementation, we choose to stop when the duality gap (29) satisfies $|\text{tr}(D(Q - P))| < \epsilon$. Since problem (8) is convex and satisfies Slater's condition, this stopping criterion always guarantees the optimal solution. The iterative procedure for finding $Q^*$ when $n \leq m$ is summarized in Algorithm 1, drop-rank-n$(\cdot)$.

Algorithm 2 *drop-rank-m*$(m, D_0, \hat{H}, H, G, V_1, V_2, P, \epsilon)$: Iterative search for $Q^*$ when $n > m$.

Require: $D_0$ diagonal $\succ 0$, $P$ diagonal $\succ 0$, $\epsilon > 0$. Also $V_1$ and $V_2$ are related to $H$ as in (22), $\hat{H}$ is defined in (23) and $G = \hat{H}\hat{H}^\dagger$.

1: Initialize $i = 0$. (iteration count)
2: Initialize $\Delta = 1 + \epsilon$ (loop terminating variable)
3: while $(\Delta > \epsilon)$ do
4:    Form $F_i = HD_iH^\dagger - L_m$ (note that $-L_m$ is included here)
5:    Perform the eigenvalue decomposition $F_i = U_F \Lambda_F U_F^\dagger$.
6:    Form $S_i = -U_F^- \Lambda_F^- U_F^{-\dagger}$ that contains all $k$ non-positive eigenmodes of $F_i$.
7:    Form $Z_i = \hat{H}S_i\hat{H}^\dagger$.
8:    Form $\tilde{D}_i = \mathrm{diag}\{(D_{i,jj})^{-1}\}, j = 1\ldots n$.
9:    Form $B_i = V_1^\dagger (Z_i - G) \tilde{D}_i V_2 \left(V_2^\dagger \tilde{D}_i V_2\right)^{-1}$.
10:   Form $A_i = \left(L_{n-m} - B_i^\dagger V_1^\dagger \tilde{D}_i V_2\right)\left(V_2^\dagger \tilde{D}_i V_2\right)^{-1}$.
11:   Form $X_i = V_2 A_i V_2^\dagger + V_1 B_i V_2^\dagger + V_2 B_i^\dagger V_1^\dagger$.
12:   Form $Q_i = \tilde{D}_i - G + Z_i - X_i$.
13:   Form $D_{i+1} = D_i + P - \mathrm{diag}(Q_i)$.
14:   Compute $\Delta = |\mathrm{tr}[D_i(Q_i - P)]|$.
15:   $i \leftarrow i + 1$.
16: end while
17: return $D_i$ and $Q_i$.

*B. Iterative algorithm for finding $Q^*$ when $n > m$*

For $n > m$, we rely on equation (26) in Theorem 2 to design a similar algorithm. Let $G = \hat{H}\hat{H}^\dagger$ (note that we reuse the symbol $G$ here but there should no confusion based on the channel size). Again we can start with the initial value $D_0$ in (30) or with any arbitrary diagonal $D_0 \succ 0$. In this case, however, iteration is always necessary (except in the unlikely event that the algorithm starts with the *optimal* D).

At step $i$ ($i \geq 0$), having obtained $\hat{D}_i$, we compute $$F_{m,i} = H\hat{D}_i H^\dagger$$
$$-S_{m,i} = \text{non-positive eigenmodes of } (F_{m,i} - L_m)$$
$$Z_i = \hat{H} S_{m,i} \hat{H}^\dagger$$
$$X_i = V_2 A_i V_2^\dagger + V_1 B_i V_2^\dagger + V_2 B_i^\dagger V_1^\dagger$$
$$Q_i = \hat{D}_i - \hat{G} + Z_i - X_i. \quad (34)$$

where $A_i$ and $B_i$ are computed from $\hat{D}_i$ and $Z_i$ as in (28). The $Q_i$ as computed in (34) is again always positive semidefinite and has rank at most $m$. Then we update $\hat{D}_{i+1}$ in the same way as in (32), and stop when the duality gap $|\text{tr}[D(Q - P)]|$ is sufficiently small. This procedure is summarized in Algorithm 2, *drop-rank-m*($\cdot$).

The integrated main program for finding the optimal $Q^*$ for all channel sizes is summarized in Algorithm 3, *opt-cov*($\cdot$).

C. Convergence analysis

*1) For $n \leq m$:* The following Corollary shows convergence of Algorithm 1.

Corollary 1. *In Algorithm 1, $\hat{D}_i$ is decreasing in $i$. This algorithm always converges to the optimal point.*

*Proof:* Consider the iterative steps (31) and (32) with initial condition (30). We will show that $\hat{D}_i$ is decreasing in $i$ by induction as follows.

First, with $i = 0$, from (30) and (31) we have $Q_0 = P + Z_0 + \text{diag}(\hat{G}) - \hat{G}$. Thus from (32), $$\hat{D}_1 = \hat{D}_0 - \text{diag}(Z_0).$$

Since $Z_0 \succeq 0$, then $\text{diag}(Z_0) \succeq 0$, and thus $\hat{D}_1 \preceq \hat{D}_0$.

Now assume that $\hat{D}_{j+1} \preceq \hat{D}_j$ for some $j \geq 0$. From (31), we then have $F_{m,j+1} \preceq F_{m,j}$. Since $F_m - L_m = R_m - S_m$, this implies $S_{m,j} - S_{m,j+1} \preceq R_{m,j} - R_{m,j+1}$. Multiplying both sides on the left and right with $S_{m,j}$ and noting that $S_{m,j} R_{m,j} = 0$, we obtain $S_{m,j}(S_{m,j} - S_{m,j+1})S_{m,j} \preceq -S_{m,j} R_{m,j+1} S_{m,j} \preceq 0$. Since $S_{m,j} \succeq 0$, this implies $S_{m,j} \preceq S_{m,j+1}$. Now multiplying both sides on the left with $K$ and on the right with $K^\dagger$, we then have $Z_j \preceq Z_{j+1}$. Based on (33), with $Z_j \preceq Z_{j+1}$, then $\hat{D}_{j+2} \preceq \hat{D}_{j+1}$. This completes the induction.

The sequence $\hat{D}_i$ is decreasing in $i$ and is lower bounded as $\hat{D}_i \succeq 0$ (in fact, $\hat{D}_i \succeq P$ for all $i > 0$ as a consequence of (33)). Thus $\hat{D}_i$ must converge. Based on (32), then $Q_i$ must also converge to the optimal value with $\text{diag}(Q) = P$. In other words, the algorithm always converges to the correct optimal value. ∎

Algorithm 3 $opt\text{-}cov(\mathbf{H}, \{P_i\}, \epsilon)$: The main program to find $\mathbf{Q}^*$ for a given channel $\mathbf{H}$.

Require: Channel $\mathbf{H}$ full-rank, per-antenna power $P_i$ real and $P_i \geq 0$, $i = 1 \ldots n$, precision $\epsilon > 0$.

1: Let $(m, n) = \text{size}(\mathbf{H})$,
   $m$ = number of rows or receive antennas,
   $n$ = number of columns or transmit antennas.
2: Perform the singular value decomposition $\mathbf{H} = \mathbf{U}_\mathbf{H} \Sigma_\mathbf{H} \mathbf{V}_\mathbf{H}^\dagger$, where
   $\mathbf{U}_\mathbf{H}$: $m \times m$ unitary matrix,
   $\mathbf{V}_\mathbf{H}$: $n \times n$ unitary matrix,
   $\Sigma_\mathbf{H}$: $m \times n$ diagonal matrix with diagonal entries as real, non-zero singular values $\sigma_{\mathbf{H},i}$ in decreasing order.
3: if $n > m$ then
4:   Form $\mathbf{V}_2$ from the last $n - m$ columns of $\mathbf{V}_\mathbf{H}$.
5:   Form $\mathbf{V}_1$ from the first $m$ columns of $\mathbf{V}_\mathbf{H}$.
6:   Form $\tilde{\Sigma}_m = \text{diag}\{\sigma_{\mathbf{H},i}^{-1}\}$, $m \times m$ diagonal matrix.
7:   Form $\tilde{\mathbf{H}} = \mathbf{V}_1 \tilde{\Sigma}_m \mathbf{U}_\mathbf{H}^\dagger$.
8:   Form $\mathbf{G} = \mathbf{V}_1 \tilde{\Sigma}_m^2 \mathbf{V}_1^\dagger$.
9: else
10:   Form $\Sigma_n = \text{diag}\{\sigma_{\mathbf{H},i}\}$, $n \times n$ diagonal matrix.
11:   Form $\mathbf{K} = \mathbf{V}_\mathbf{H} \Sigma_n \mathbf{V}_\mathbf{H}^\dagger$.
12:   Form $\tilde{\Sigma}_n = \text{diag}\{\sigma_{\mathbf{H},i}^{-1}\}$, $n \times n$ diagonal matrix.
13:   Form $\tilde{\mathbf{K}} = \mathbf{V}_\mathbf{H} \tilde{\Sigma}_n \mathbf{V}_\mathbf{H}^\dagger$.
14:   Form $\mathbf{G} = \mathbf{V}_\mathbf{H} \tilde{\Sigma}_n^2 \mathbf{V}_\mathbf{H}^\dagger$.
15: end if
16: Form $\mathbf{P} = \text{diag}\{P_i\}$, $n \times n$ diagonal matrix.
17: Form $\hat{\mathbf{D}}_0 = \mathbf{P} + \text{diag}(\mathbf{G})$.
18: if $n \leq m$ then
19:   $(\hat{\mathbf{D}}, \mathbf{Q}) = drop\text{-}rank\text{-}n(n, \hat{\mathbf{D}}_0, \mathbf{K}, \tilde{\mathbf{K}}, \mathbf{G}, \mathbf{P}, \epsilon)$
20: else
21:   $(\hat{\mathbf{D}}, \mathbf{Q}) = drop\text{-}rank\text{-}m(m, \hat{\mathbf{D}}_0, \mathbf{H}, \tilde{\mathbf{H}}, \mathbf{G}, \mathbf{V}_1, \mathbf{V}_2, \mathbf{P}, \epsilon)$
22: end if
23: return $\mathbf{Q}$ Note that convergence holds for any starting point such that $\text{diag}(\mathbf{Q}_0) \succeq \mathbf{P}$ or $\text{diag}(\mathbf{Q}_0) \preceq \mathbf{P}$.

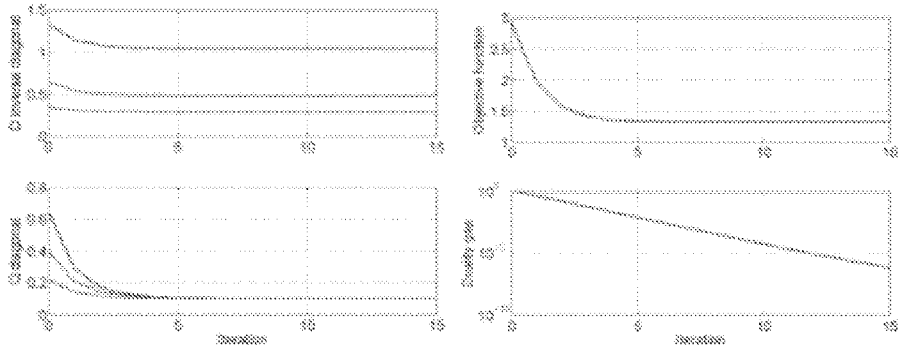

Fig. 1. Typical convergence for a 3 × 3 channel at SNR = −5dB and ε = 10⁻⁵.

not just the value of $\hat{D}_0$ in (30). The former comes directly from the above proof, whereas the latter simply requires a change of all inequality directions in the proof and changing the multiplication with $S_{a,j}$ to with $S_{a,j+1}$. Numerical examples, however, show convergence for all values of $\hat{D}_0 \succ 0$ even when this initial point is randomly generated, which suggests that the algorithm, particularly the dual update step in (32), is more robust than shown in here.

Figure 1 shows a typical convergence behavior of $\hat{D}_i$ and $\text{diag}(Q_i)$ as well as the objective function value and the duality gap for $n = m = 3$ (the channel is generated randomly according to the circularly complex Gaussian distribution). The convergence shown is typical for the numerous simulations we have run with multiple channel sizes. Although we do not analyze the speed of convergence in this paper, in all these simulations, the convergence rate is observed to be exponentially fast.

*2) For $n > m$:* Now consider Algorithm 2 with iterative steps (34) and (32) and initial condition (30). The algorithm in this case is more complex. Here $\hat{D}_i$ is not always decreasing in $i$, but some of its diagonal elements are decreasing and others increasing. However, we observe that $\hat{D}_i \pi$ is decreasing in $i$ (in the semidefinite sense) for some diagonal matrix $\pi$ with only 1 and −1 on the diagonal such that for the initial step, $\text{diag}(Q_0)\pi \succeq P\pi$ (or after a number of iterations $K$, $\text{diag}(Q_K)\pi \succeq P\pi$). That is $\hat{D}_i\pi \succeq \hat{D}_{i+1}\pi$. The detailed analysis is given in Appendix C.

Given $\hat{D}_i\pi$ is decreasing in $i$, then $\hat{D}_i$ converges, which implies from (32) that $\text{diag}(Q_i)$ converges to $P$. The convergence is also observed numerically to hold for any starting point $\hat{D}_0$.

Figure 2 shows a typical convergence behavior for a random channel with $n = 4$ and $m = 2$ at low SNR (−5dB). Again the convergence rate appears to be exponentially fast. Numerical simulations show that higher SNR generally leads to faster convergence.

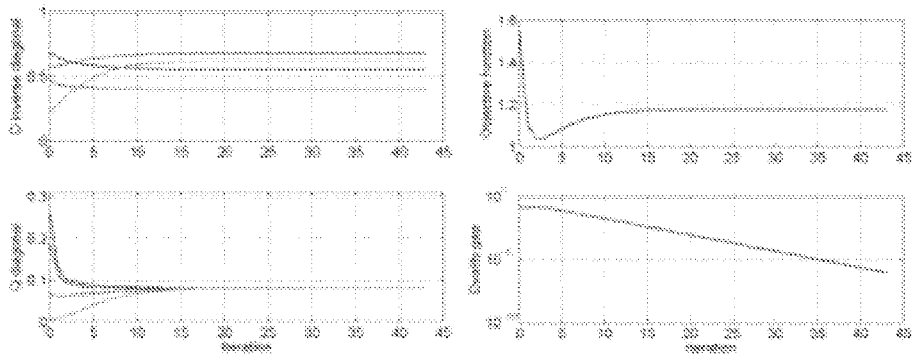

Fig. 2. Typical convergence for a 2 × 4 channel at SNR = -5dB, $\epsilon = 10^{-6}$ and random starting point $\hat{D}_0$.

D. Connections with water-filling and multiple-access

As noted in Section IV-A, all 3 power constraints can be analyzed in the SDP framework (8). The only difference is in the dual variable associated with each power constraint in the Lagrangian (9). This dual variable for the sum, per-antenna and multiple-access constraint respectively is equal to $\nu I_n$ (scaled identity), $D$ (square diagonal) and $B$ (square full matrix). This change of dual variable, however, makes it possible to find closed-form solutions for the sum and multiple access constraints. Next we will discuss these solutions and the implication on input eigenbeams.

*1) Optimal solutions for sum and multiple access constraints:* For the sum power constraint, all results of Theorems 1 and 2 apply by replacing $D$ with $\nu I_n$. This change, however, makes it possible to find closed-form solutions for $\nu$ even with mode-dropping. In particular, with sum power constraint, the result of Theorem 1 becomes $$Q = \nu^{-1} I_n - KK^\dagger + KS_\nu K^\dagger, \qquad (35)$$

where $(-S_\nu)$ now contains the non-positive eigenmodes of $\nu^{-1}KK^\dagger - I_n$. Equation (35) then implies that $Q$ has the same eigenvectors as those of $K$, which are $V_H$ (the right singular vectors of $H$). Similar eigenvector analysis holds for Theorem 2. These eigenvectors then lead directly to the water-filling solution (6) for the eigenvalues of $Q$, where $\mu = 1/\nu$. As such, a closed-form solution for the optimal dual variable $\nu^*$ can be obtained as $$\nu^* = \left( P + \sum_{i=1}^{K} \frac{1}{\lambda_{H,i}} \right)^{-1}$$

where $K \leq \min(m, n)$ is the number of active modes (assuming $\lambda_{H,i}$ are in decreasing order).

Similarly, for the multiple access constraint, results of Theorems 1 and 2 also hold with $D$ being replaced by a full $n \times n$ positive semidefinite matrix $B$. In this case, the optimal covariance is $Q = P$ and there is no mode dropping ($S_u = 0$ and $S_{uq} = 0$). Thus for $n \leq m$, we can easily identify the optimal dual variable as $B^* = (P + G)^{-1}$. For $n > m$, closed-form expression for $B^*$ can also be derived from (25)-(28).

*2) Comments on input eigenbeams:* In both cases of sum and multiple access constraint, the eigenvectors of the optimal $Q$ are independent of the dual variable. For the per-antenna constraint, however, eigenvectors of $Q$ depend on the dual $D$ as shown in Theorems 1 and 2. As a consequence, the optimal beamforming directions with per-antenna constraint are not the right singular vectors of the channel (as discussed in Section III). For MISO channels, the rank-one optimal $Q$ is shown to have its eigenvector matched to the phase but not the amplitude of the channel vector [8]. For MIMO channels, the relation is more complicated as the eigenvectors of $Q$ depend on multiple factors: the channel $H$, the per-antenna constraint $P$ and also the SNR. The proposed algorithms do not separate the eigenbeams and power allocation but establish them together in the full matrix form of the covariance $Q$.

VII. FADING MIMO CAPACITIES WITH NO CSIT

In this section, we consider the case of fading channel with no CSIT. The transmitter does not know the channel realization $H$ but only knows its distribution as a circularly complex Gaussian matrix with zero mean and covariance $I_{n \times m}$. In this case, we need to consider the ergodic capacity. For all power constraints, capacity optimization can now be cast as follows.

$$\max \quad E_H \left[ \log \det \left( I_m + HQH^\dagger \right) \right] \quad (36)$$
$$\text{s.t.} \quad g(Q, P) \leq 0, \quad Q \succeq 0,$$

where $g(Q, P) \leq 0$ refers to a specific power constraint as in (3), (4) or (5). Different from (8), the optimal $Q$ is no longer a function of $H$ but only of its distribution.

With sum power, the capacity of MIMO fading channel was established in the seminal paper by Telatar [2]. The optimal covariance of the Gaussian transmit signal is $Q = \frac{P}{n} I$, implying that each antenna sends independent signal with equal power. With multiple-access constraint, the transmit covariance again has to be $Q = P$.

We have established the ergodic capacity with per-antenna power for the MISO channel earlier in [8] and showed that it is the same as capacity under multiple-access constraint with optimal $Q = P$. The same conclusion, in fact, holds for MIMO channels. For the sake of completeness, we provide the analysis with a shorter proof for MIMO channels here. We use an approach similar to [2] but only apply the following set of diagonal matrices instead of all unitary matrices. Define $\Pi^{(j)}$ as an $n \times n$ diagonal matrix with all 1 on the diagonal except a $(-1)$ at location $j$. Then $H\Pi^{(j)}$ has the same distribution as $H$ and hence $$E_H \left[ \log \det \left( I + HQH^\dagger \right) \right] = E_H \left[ \log \det \left( I + H\Pi^{(j)} Q \Pi^{(j)\dagger} H^\dagger \right) \right].$$

Here the set of $\Pi^{(j)}$ matrices preserves the diagonal values of $\Pi^{(j)}Q\Pi^{(j)T}$. We can then apply the following inequality based on the concavity of log det function:

$$r = \frac{1}{2}\left(E_\mathbf{H}\left[\log\det\left(1 + \mathbf{H}\Pi^{(j)}\mathbf{Q}\Pi^{(j)T}\mathbf{H}^\dagger\right) + \log\det\left(1 + \mathbf{HQH}^\dagger\right)\right]\right)$$

$$\leq E_\mathbf{H}\left[\log\det\left(1 + \frac{1}{2}\mathbf{H}\left(\Pi^{(j)}\mathbf{Q}\Pi^{(j)T} + \mathbf{Q}\right)\mathbf{H}^\dagger\right)\right]$$

$$= E_\mathbf{H}\left[\log\det\left(1 + \mathbf{H}\mathbf{Q}^{(j)}\mathbf{H}^\dagger\right)\right],$$

where $\mathbf{Q}^{(j)}$ is a matrix with the same diagonal entries as $\mathbf{Q}$ but with elements on row $j$ and column $j$ all equal to zero except for the diagonal element. Repeatedly applying this inequality with different values of $j$ to the resulting covariance matrix, we will arrive at $$r \leq E_\mathbf{H}\left[\log\det\left(1 + \mathbf{HPH}^\dagger\right)\right].$$

Hence the capacity is achieved by setting $\mathbf{Q} = \mathbf{P}$. Since the set of diagonal matrices $\Pi^{(j)}$ used here is a subset of all unitary matrices used in [2], it follows immediately that the ergodic capacity with per-antenna power is smaller than or equal to the ergodic capacity with sum power. If and only if the per-antenna constraint is $\mathbf{P} = \frac{P}{n}\mathbf{I}_n$, then the two capacities are equal.

VIII. NUMERICAL CONVERGENCE RESULTS AND COMPARISON

In this section, we focus on the perfect CSIT case for which per-antenna power makes a significant difference. We first provide a numerical example to illustrate MIMO capacity with per-antenna power constraint. We then focus on providing convergence statistics and compare convergence as well as complexity between the proposed algorithm and the algorithm in [9]. We have also verified that for the case of single receive antenna ($m = 1$), the proposed algorithm converges to the same result as the closed-form solution in [8].

A. An example about impact of per-antenna power on capacity

To see the impact of separate power constraint on each antenna, we vary the constraint $\mathbf{P} = \text{diag}(P_1, P_2)$ for a $2 \times 2$ channel such that the total power $P_1 + P_2 = 1$ (the SNR = 0dB). Figure 3 shows a typical capacity plot for a channel randomly generated according to the circularly complex Gaussian distribution (as in Rayleigh fading). The specific channel for this figure is $$\mathbf{H} = \begin{bmatrix} 0.0541 - 0.4066i & -0.4339 + 0.0033i \\ -1.3280 - 0.1872i & 0.8260 - 0.0279i \end{bmatrix}.$$

The figure shows that input power constraint can affect the capacity significantly. For example, even at equal constraints $P_1 = P_2 = 0.5$, the capacity with per antenna power is significantly

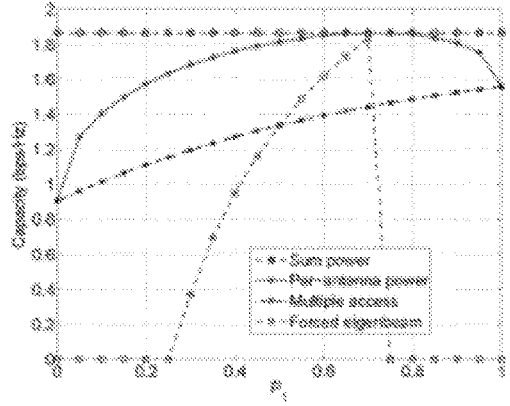

Fig. 3. Capacities of a 2 × 2 channel with perfect CSIT at SNR = 0dB with $P = diag\{P_1, 1 - P_1\}$.

higher than with multiple access constraint, but is still lower than with sum power. Sum power constraint, however, does not result in equal power at each antenna at this point.

Also plotted is the achievable rate for per-antenna constraint using forced eigenbeams as the channel right singular vectors as in (7). The 3 lines for capacity with sum power, capacity with per-antenna power and rate achievable with forced eigenbeams meet at a single point when the per-antenna constraint is such that it coincides with the optimal power per antenna under sum constraint. Other than this point, the rate with forced eigenbeams is always smaller than capacity with per-antenna power and goes to zero at certain $P$ because no solutions exist for (7). However, if we relax this constraint to allow antennas using less than full power, then solution can be obtained as in Algorithm (A2) of [9]. Consequently, using forced eigenbeams can limit the amount of power that can be used at each antenna to be less than the maximum value.

*B. Convergence results and comparison with the algorithm in [9]*

*1) Comparing the primal solutions:* As a cross-checking step, we implemented the primal solution of [9] (as in equation (15) of this reference) together with our dual update in (32) and confirmed that it performs identically to our algorithm at every iteration. This cross-check verifies that the primal solutions in both papers are the same because of the uniqueness of solution to convex problems.

The forms of these two primal solutions, however, are different, as the solution in [9] is based on eigenvalue decomposition of $Q$, whereas our solutions in (21) and (26) are in the form of the full matrix $Q$. These different forms also lead to different complexity when computing the primal solutions. In particular, for the case of $n \leq m$, the primal update in [9] requires

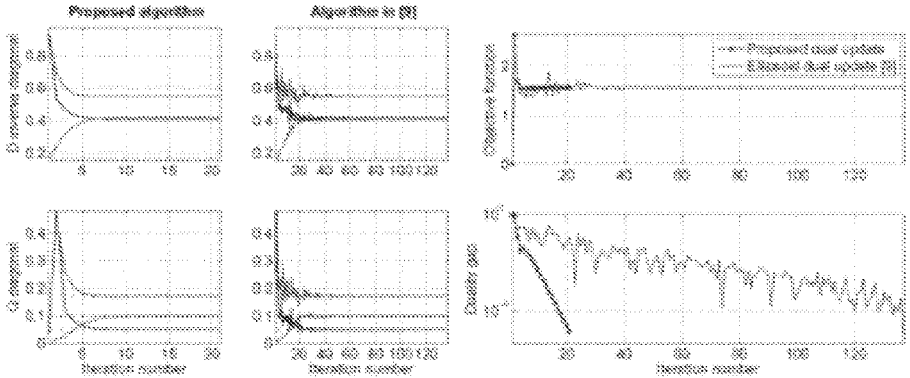

Fig. 4. Convergence comparison for a 3 × 3 channel at SNR = -5dB, ε = 10⁻⁶ and random starting point D₀.

matrix multiplications with multiple matrices newly formed at every iteration, whereas for the equivalent steps, our primal update in (31) only requires a single matrix multiplication with a fixed matrix and then simple matrix additions. For the case $n > m$, our primal update in (34) requires forming several other low rank matrices at each iteration and hence is likely more computationally complex.

Note also that the primal solution in [9] uses eigenvalue decomposition and water-filling and hence does not need to distinguish between these two cases of channel size. Our primal solution, being in a full matrix form, depends on whether the channel is row or column rank-limited. Since the input covariance matrix is always of the size of columns of the channel matrix (i.e. the number of transmit antennas), by solving for the full matrix Q, we need to distinguish between the two cases of channel size.

*2) Comparing the dual updates and convergence:* We now perform statistical analysis of the convergence rates of the proposed algorithm and the algorithm in [9], which we implemented.

Figure 4 shows an example of the convergence of these two algorithms for a specific realization of the 3 × 3 channel. We can see that the ellipsoid dual update in [9] produces slow and non-smooth convergence, in contrary to our proposed dual update. This convergence is expected of the ellipsoid method since it belongs to the class of subgradient methods, which are not descent methods and hence the function value can either increase or decrease at each iteration. This figure is typical of the convergence seen in these two algorithms.

Figure 5 shows the statistics of the convergence rate of the two algorithms for channels with $n = m$. These statistics are obtained by randomly generating 1000 realizations for each channel size. On the left of Figure 5 we show the mean and standard deviation of the numbers of iterations of our proposed algorithm for 2 classes of channel size: $n = m$ and $n = 2m$.

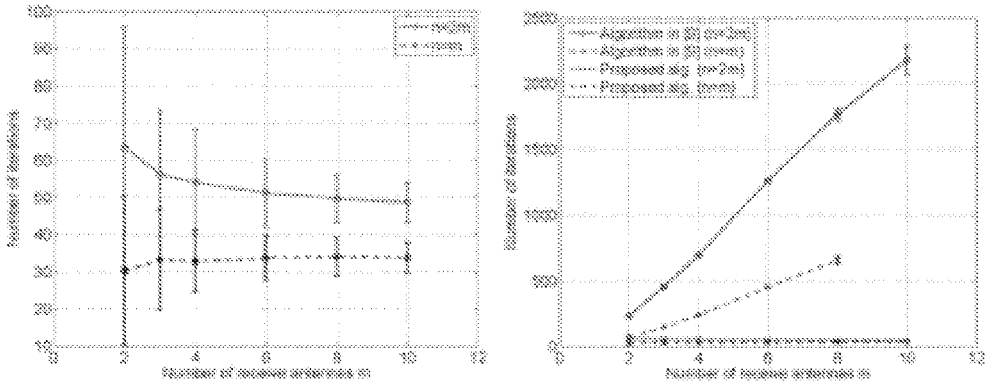

Fig. 5. Convergence statistics based on 1000 independent realizations for each channel size, SNR = -5dB, ε = 10⁻⁶ (left: our proposed algorithm; right: comparison with the algorithm in [9]).

Somewhat surprisingly, the mean stays almost constant in each class irrespective of the actual channel size, whereas the deviation actually decreases with the channel size.

On the right of Figure 5, we compare the mean and standard deviation of the convergence rates between our algorithm and the algorithm in [9]. We can see that the algorithm in [9] is very slow to converge (one or two orders of magnitude slower than our algorithm) and is strongly dependent on the channel size. Based on the ellipsoid method, its convergence rate critically depends on the number of transmit antennas $n$ and is $O(n^2)$ for large $n$ [11]. The obtained statistics also suggest that its convergence rate increases linearly with the number of receive antennas $m$.

These numerical simulations also show that the algorithm in [9] is highly sensitive to the initial starting point $D_0$. This algorithm fails to converge for a significant number of channels, as reported in Table I. It is possible that choosing a different initial point for the ellipsoid update (see the example in [11]) as well as the initial value $D_0$ will allow for better converge, but it will require searching for such initial values. We should point out here that while the ellipsoid method can be proved to converge, it does so when the problem parameters do not change over different iterations. But in [9], because of the concurrent primal and dual updates occurring at each iteration, the parameters for the ellipsoid updates are also varying at each iteration and hence convergence is not guaranteed.

For the proposed dual update (32), we found in all simulations that the algorithm always converges even with random starting point $D_0$. This convergence holds with either our primal solution or the primal solution in [9]. This fact suggests that the proposed dual update is actually more robust than shown earlier in the convergence proof.

March 31, 2013

| number of receive antennas $n$ | 2 | 3 | 4 | 6 | 8 | 10 |
|---|---|---|---|---|---|---|
| non-convergence cases for $n = m$ | 72 | 124 | 98 | 587 | 961 | 1000 |
| non-convergence cases for $n = 2m$ | 508 | 523 | 647 | 739 | 877 | 953 |

TABLE I
NUMBER OF NON-CONVERGENT CASES (OUT OF 1000) FOR THE ALGORITHM IN [9].

IX. CONCLUSION

We have established the MIMO capacity under per-antenna power constraint with perfect transmitter channel state information. The optimal input covariance matrix is no longer diagonalizable by the channel right singular vectors as with sum power constraint. We formulate the optimization as a SDP and use the KKT conditions to solve in closed-form the optimal covariance matrix as a function of the dual variable. We then design an efficient algorithm to update this dual variable and hence establish the optimal input signaling. Numerical statistics of convergence show that the proposed algorithm has fast, smooth convergence that is independent of the channel size and the starting point. Compared to the independent result in [9], our result provides an alternative primal solution form and a customized dual update that leads to significantly faster, smoother and more robust convergence.

APPENDIX

A. Proof of Lemma 1

In this proof, we make repeated use of the following identity expansion:

$$I_m = (L_m + HQH^\dagger)(L_m + HQH^\dagger)^{-1}. \qquad (37)$$

Note that the order of the two factors in this expansion is interchangeable.

To prove (14), multiplying the first equation in (10) on the right with $QH^\dagger$ and on the left with $HD$, and noting that $MQ = 0$, we get $$H\tilde{D}H^\dagger(L_m + HQH^\dagger)^{-1}HQH^\dagger = HQH^\dagger.$$

Now subtracting both sides by $H\tilde{D}H^\dagger$, then applying identity expansion (37), this equation simplifies to $$-H\tilde{D}H^\dagger(L_m + HQH^\dagger)^{-1} = HQH^\dagger - H\tilde{D}H^\dagger.$$

Next adding both sides with $L_m$ and again using identity expansion (37), we get $$(L_m + HQH^\dagger - H\tilde{D}H^\dagger)(L_m + HQH^\dagger)^{-1} = L_m + HQH^\dagger - H\tilde{D}H^\dagger.$$

Denote $S_m = L_m + HQH^\dagger - H\hat{D}H^\dagger$ similar to (15), the above equation becomes $$S_m \left( L_m - (L_m + HQH^\dagger)^{-1} \right) = 0.$$

Then applying identity expansion (37) once more, we obtain $$S_m (HQH^\dagger)(L_m + HQH^\dagger)^{-1} = 0.$$

Since $(L_m + HQH^\dagger)^{-1}$ is a full-rank square matrix, the above equation is equivalent to (14).

We can also show a relationship between $S_m$ and $M$ as follows. From the first equation in (10), subtracting $H^\dagger H$ from both sides, we have $$H^\dagger \left[ (L_m + HQH^\dagger)^{-1} - L_m \right] H = D - M - H^\dagger H.$$

Using identity expansion (37), we obtain $$H^\dagger (L_m + HQH^\dagger)^{-1} HQH^\dagger H = H^\dagger H - D + M.$$

Now replacing a part of the left expression by the first equation in (10), we have $$(D - M)QH^\dagger H = H^\dagger H - D + M.$$

But $MQ = 0$, hence we have $$M = DQH^\dagger H + D - H^\dagger H.$$

Multiplying both sides on the left by $H\hat{D}$, we obtain $$H\hat{D}M = S_m H.$$

Since $\hat{D}$ is square and full-rank, the above relationship implies that $\text{rank}(S_m) = \text{rank}(M) = k$ unless $S_m$ also lies in the null space of $H$.

*B. Proof of Theorem 2*

From equation (25), multiplying on the left with $\hat{H}$ and on the right with $\hat{H}^\dagger$, we get $$V_1 V_1^\dagger (Q - D) V_1 V_1^\dagger = \hat{H} S_m \hat{H}^\dagger - \hat{H}\hat{H}^\dagger$$

Denote $Z = \hat{H} S_m \hat{H}^\dagger$ and $G = \hat{H}\hat{H}^\dagger$. Now multiply the above equation on the left with $V_1^\dagger$ and on the right with $V_1$, and noting that $V_1^\dagger G V_1 = \Sigma_{\hat{H}}^2$, we get $$V_1^\dagger (D + Z - Q) V_1 = \Sigma_{\hat{H}}^2.$$

Since $V_2^\dagger V_1 = 0$, the above equation implies that $$\hat{D} + Z - Q = [V_1 \ V_2] \begin{bmatrix} \Sigma_H^{-2} & B \\ B^\dagger & A \end{bmatrix} \begin{bmatrix} V_1^\dagger \\ V_2^\dagger \end{bmatrix}$$

$$= V_1 \Sigma_H^{-2} V_1^\dagger + V_2 A V_2^\dagger + V_1 B V_2^\dagger + V_2 B^\dagger V_1^\dagger$$

for some Hermitian $(n - m) \times (n - m)$ matrix $A$ and some $m \times (n - m)$ matrix $B$. Thus we can write $Q$ as in (26).

The remaining question is to find $A$ and $B$ such that the rank condition in (24) is satisfied. To do this, multiplying equation (26) on the right with $DV_2$ and on left with either $V_2^\dagger$ or $V_1^\dagger$, and noting that $V_2^\dagger Z = V_2^\dagger G = 0$, we obtain respectively $$0 = I_{n-m} - A V_2^\dagger D V_2 - B^\dagger V_1^\dagger D V_2,$$

$$0 = V_1^\dagger (Z - G) D V_2 - B V_2^\dagger D V_2.$$

Noting that $V_2^\dagger D V_2$ is full rank and invertible, we then obtain (28).

C. Convergence analysis for $n > m$

In this Appendix, we analyze Algorithm 2 for $n > m$ to support the observation that $\hat{D}_i \pi$ decreasing in $i$, where $\pi$ is a diagonal matrix with only 1 and -1 on the diagonal such that $\text{diag}(Q_0) \pi \succeq P \pi$.

To show $\hat{D}_{i+1} \pi \preceq \hat{D}_i \pi$, we use induction. For $i = 0$, from (32), we have $$\hat{D}_1 = \hat{D}_0 + P - \text{diag}(Q_0).$$

Since $\text{diag}(Q_0) \pi \succeq P \pi$, it then follows that $\hat{D}_1 \pi \preceq \hat{D}_0 \pi$.

Suppose that the inequality holds for $i = j$, such that $\hat{D}_{j+1} \pi \preceq \hat{D}_j \pi$. From (34), we have $$\hat{D}_j - \hat{D}_{j+1} = (Q_j - Q_{j+1}) - (Z_j - Z_{j+1}) + (X_j - X_{j+1}).$$

Multiplying both sides on the right with $\pi$ and applying $\hat{D}_{j+1} \pi \preceq \hat{D}_j \pi$, we obtain $$(Z_j - Z_{j+1}) \pi - (X_j - X_{j+1}) \pi \preceq (Q_j - Q_{j+1}) \pi.$$

Now multiplying both sides on the left with $V_2^\dagger D_j$ and on the right with $D_j V_2$ and noting that $V_2^\dagger D_j Q_j = 0$, we get $$V_2^\dagger D_j [(Z_j - Z_{j+1}) \pi - (X_j - X_{j+1}) \pi] D_j V_2 \preceq -V_2^\dagger D_j Q_{j+1} \pi D_j V_2. \qquad (38)$$

Based on (38) we conjecture that $$(Z_j - Z_{j+1}) \pi - (X_j - X_{j+1}) \pi \preceq -Q_{j+1} \pi. \qquad (39)$$

This is only a conjecture because $V_2^\dagger D_j$ is rank deficient, so (38) need not always imply (39) in general. However, we observe through simulations that it always holds true under the setup of this problem (either from the first iteration or after a number of initial iterations), which suggests some relation or condition among these matrices that makes the above inequality holds.

Next multiplying both sides of (39) on the left with $V_2^\dagger D_{j+1}$ and on the right with $D_{j+1} V_2$ and noting that $V_2^\dagger D_{j+1} Q_{j+1} = 0$, we get $$V_2^\dagger D_{j+1} [(Z_j - Z_{j+1})\pi - (X_j - X_{j+1})\pi] D_{j+1} V_2 \preceq 0,$$

which by the same conjecture leads to $$(Z_j - Z_{j+1})\pi - (X_j - X_{j+1})\pi \preceq 0. \tag{40}$$

Now from (32) and (34), we have $$\hat{D}_{j+1} = P + \text{diag}(\hat{G}) - \text{diag}(Z_j - X_j). \tag{41}$$

Combined with (40), since the diagonal of a positive semidefinite matrix is non-negative, we have $$\hat{D}_j \pi - \hat{D}_{j+1} \pi = \text{diag}(Z_j - X_j)\pi - \text{diag}(Z_{j+1} - X_{j+1})\pi \preceq 0,$$

which completes the induction.

We find numerically that the premise of $\hat{D}_j \pi$ decreasing always holds either from the initial iteration or after a finite number of iterations, regardless of the initial point $\hat{D}_0$. If it holds after a number of initial iterations, we can reset $Q_0 \pi$ to be the new value at the iteration that the premise starts to hold.

REFERENCES

[1] T. Cover and J. Thomas, *Elements of Information Theory*, 2nd ed. John Wiley & Sons, Inc., 2006.

[2] I. Telatar, "Capacity of multi-antenna Gaussian channels," *European Transactions on Telecommunications*, vol. 10, no. 6, pp. 585-595, Nov 1999.

[3] W. Yu, W. Rhee, S. Boyd, and J. Cioffi, "Iterative water-filling for Gaussian vector multiple-access channels," *Information Theory, IEEE Transactions on*, vol. 50, no. 1, pp. 145-152, 2004.

[4] W. Yu and T. Lan, "Transmitter optimization for the multi-antenna downlink with per-antenna power constraints," *IEEE Transactions on Signal Processing*, vol. 55, no. 6, pp. 2646-2660, Jun 2007.

[5] M. Codreanu, A. Tolli, M. Juntti, and M. Latva-aho, "MIMO downlink weighted sum rate maximization with power constraints per antenna groups," in *IEEE ITG Spring*, 2007, pp. 2048-2052.

[6] S. Shi, M. Schubert, and H. Boche, "Per-antenna power constrained rate optimization for multiuser MIMO systems," in *International ITG Workshop on Smart Antennas (WSA)*, 2008, pp. 270-277.

[7] J. Yang and D. K. Kim, "Multi-cell uplink-downlink beamforming throughput duality based on lagrangian duality with per-base station power constraints," *Communications Letters, IEEE*, vol. 12, no. 4, pp. 277-278, 2008.

[8] M. Vu, "MISO Capacity with Per-Antenna Power Constraint," *IEEE Trans. on Communications*, May 2011.

March 31, 2013

[9] R. Zhang, "Cooperative multi-cell block diagonalization with per-base-station power constraints," *Selected Areas in Communications, IEEE Journal on*, vol. 28, no. 9, pp. 1435–1445, 2010.

[10] S. Boyd and L. Vandenberghe, *Convex Optimization*. Cambridge, UK: Cambridge University Press, 2003. [Online]. Available: http://www.stanford.edu/~boyd/cvxbook.html

[11] R. G. Bland, D. Goldfarb, and M. J. Todd, "The ellipsoid method: A survey," *Operations Research*, pp. 1039–1091, 1981.

[12] H. Van Trees, *Optimum Array Processing (Detection, Estimation, and Modulation Theory, Part IV)*. New York: Wiley, 2002.

March 31, 2013

The invention claimed is:

1. A method for transmitting information comprising:

providing a communication system having, n transmitting antennas and m receiving antennas, n≤m wherein said communication system is subject to a per-antenna power constraint, said communication system operating to produce a received signal characterized by a vector y, the elements of vector y corresponding to said m receiving antennas respectively, in response to a transmitted signal characterized by a vector x, the elements of vector x corresponding to said n transmitting antennas respectively, said signal being transmitted through a channel characterized by a channel matrix H of circular complex multiplicative factors and in the presence of Gaussian white noise characterized by a vector z according to the relationship: y=Hx+z;

operating a linear precode device to derive, in real time, a linear precode for a communication channel based on said antenna power constraint and a channel state information matrix, said operating said linear precode device including iteratively performing the following method steps, where variable index i identifies the values associated with a particular iteration of the iterative method:

1) forming a temporary matrix F, where $F_i = K\check{D}_i K^\dagger - I_n$, $F_i$ being the value of a temporary matrix F at a current iteration, K being a matrix such that $K = V_H \Sigma_n V_H^\dagger$, where $V_H$ is a unitary matrix containing a plurality of right singular values obtained by singular value decomposition of the channel matrix H, and $V_H^\dagger$ is the hermitian conjugate transpose of $V_H$, $\Sigma_n$ being a diagonal matrix containing said corresponding (real) singular values in decreasing order, $\check{D}_i$ being the value of the matrix $\check{D}$ at the ith iteration of the method, where $\check{D}$ is the inverse of a matrix D, D being a diagonal matrix consisting of Lagrangian multipliers for respective per-antenna power constraints of said n transmitter antennas, $K^\dagger$ being the hermitian conjugate transpose of K, and $I_n$ being an identity matrix of dimension n;

2) performing an eigenvalue decomposition of said temporary matrix F, where
   $F_i = U_F \Lambda U_F^\dagger$, $U_F$ being a matrix consisting of the resulting eigenvectors, $\Lambda$ being a matrix of eigenvalues, $U_F^\dagger$ being the hermitian conjugate transpose of $U_F$, and;

3) discarding non-positive eigenvalues of said temporary matrix F;

4) forming a matrix $S_i$, where $S_i = -U_F^k \Lambda_F^k U_F^{k\dagger}$, and where k is the number of said non-positive eigenvalues and $S_i$ being a matrix consisting of non-positive eigenmodes of $(F-I_n)$, $\Lambda_F^k$ is the k×k diagonal matrix of all k non-positive eigenvalues of $F_i$ and where $U_F^k$ consists of the corresponding k eigenvectors and where $U_F^{k\dagger}$ is the hermitian conjugate transpose of $U_F^k$;

5) forming a matrix $Z_i$ where $Z_i = \check{K} S_i \check{K}^\dagger$ $Z_i$ being the value of a matrix Z at the ith iteration of the method, where $\check{K}$ is the inverse matrix of matrix K and $\check{K}^\dagger$ is the hermitian conjugate transpose of $\check{K}$;

6) forming a transmitted signal covariant matrix $Q_i$ where $Q_i = \check{D}_i - \check{G} + Z_i$;

$Q_i$ being the value of the transmitted signal covariant matrix at the ith iteration of the method, and $\check{G}$ being a subsidiary matrix equal to $\check{K}\check{K}^\dagger$; and encoding information to be transmitted according to said linear precode by applying, as a linear precode, a resulting transmitted signal covariance matrix $Q_i$ of the final iteration, to modify an encoded signal to be transmitted from said transmitting antennas.

2. A method for transmitting information as defined in claim 1 wherein the values of said channel matrix H are acquired by evaluation of a pilot signal and subsequent receipt by the transmitter of a corresponding feedback signal.

3. a method for transmitting information as defined in claim 1 wherein the values of said channel matrix H are acquired by reciprocal information based on received general information signals.

* * * * *